US008077401B2

(12) United States Patent
Robinson

(10) Patent No.: US 8,077,401 B2
(45) Date of Patent: Dec. 13, 2011

(54) CATADIOPTRIC IMAGING SYSTEM

(75) Inventor: M. Dirk Robinson, Menlo Park, CA (US)

(73) Assignee: Ricoh Co., Ltd., Tokyo (JP)

( * ) Notice: Subject to any disclaimer, the term of this patent is extended or adjusted under 35 U.S.C. 154(b) by 1016 days.

(21) Appl. No.: 11/866,860

(22) Filed: Oct. 3, 2007

(65) Prior Publication Data

US 2009/0091797 A1    Apr. 9, 2009

(51) Int. Cl.
*G02B 17/00* (2006.01)
(52) U.S. Cl. .......... 359/727; 359/649; 359/676; 353/98
(58) Field of Classification Search .......... 359/648–651, 359/676–706, 726, 727, 733–736, 754–795; 382/284; 348/36–39; 353/98, 99
See application file for complete search history.

(56) References Cited

U.S. PATENT DOCUMENTS

| | | | |
|---|---|---|---|
| 5,227,890 A | 7/1993 | Dowski | |
| 5,521,695 A | 5/1996 | Dowski | |
| 5,748,371 A | 5/1998 | Cathey | |
| 5,870,179 A | 2/1999 | Cathey | |
| 6,021,005 A | 2/2000 | Cathey | |
| 6,069,738 A | 5/2000 | Cathey | |
| 6,118,474 A | 9/2000 | Nayar | |
| 6,412,961 B1 | 7/2002 | Hicks | |
| 6,459,451 B2 * | 10/2002 | Driscoll et al. | 348/335 |
| 6,525,302 B2 | 2/2003 | Dowski | |
| 6,545,702 B1 | 4/2003 | Konolige et al. | |
| 6,842,297 B2 | 1/2005 | Dowski | |
| 6,873,733 B2 | 3/2005 | Dowski | |
| 6,911,638 B2 | 6/2005 | Dowski | |
| 6,940,649 B2 | 9/2005 | Dowski | |
| 7,058,239 B2 | 6/2006 | Singh et al. | |
| 7,133,031 B2 | 11/2006 | Wang et al. | |
| 2002/0118457 A1 | 8/2002 | Dowski | |
| 2002/0195548 A1 | 12/2002 | Dowski | |
| 2003/0057353 A1 | 3/2003 | Dowski | |
| 2003/0169944 A1 | 9/2003 | Dowski | |
| 2003/0173502 A1 | 9/2003 | Dowski | |
| 2004/0145808 A1 | 7/2004 | Cathey | |
| 2004/0190762 A1 | 9/2004 | Dowski | |
| 2004/0228005 A1 | 11/2004 | Dowski | |
| 2004/0257543 A1 | 12/2004 | Dowski | |
| 2005/0088745 A1 | 4/2005 | Cathey | |
| 2005/0117114 A1 | 6/2005 | Jiang | |
| 2005/0197809 A1 | 9/2005 | Dowski | |
| 2005/0264886 A1 | 12/2005 | Dowski | |

(Continued)

FOREIGN PATENT DOCUMENTS

EP    0814605 A2    12/1997

(Continued)

OTHER PUBLICATIONS

Fales, C.L. et al., "Imaging System Design for Improved Information Capacity," Applied Optics, Mar. 15, 1984, pp. 872-888, vol. 23, No. 6.
Cathey, W. Thomas et al, *New paradigm for imaging systems*, Applied Optics, vol. 41, No. 29, Oct. 10, 2002, pp. 6080-6092.
European Search Report, EP06253130, Sep. 26, 2005, 7 pages.
Gyeong-Il Kweon et al, *Wide-angle catadioptric lens with a rectilinear projection scheme*, Applied Optics, Dec. 1, 2006, pp. 8659-8673, vol. 45, No. 34.

(Continued)

*Primary Examiner* — Darryl J Collins
(74) *Attorney, Agent, or Firm* — Fenwick & West LLP

(57) ABSTRACT

A catadioptric imaging system combines a rectifying mirror, a lens system and subsequent image processing. This approach can produce a small form factor desktop document imaging system capable of producing high-quality, high-resolution images of paper documents.

55 Claims, 23 Drawing Sheets

U.S. PATENT DOCUMENTS

2008/0213703 A1* 9/2008 Shafer et al. .................. 430/319

FOREIGN PATENT DOCUMENTS

EP           0998124  A2    5/2000
WO    WO 2004/063989  A2    7/2004

OTHER PUBLICATIONS

Maeda, Peter Y et al, *Integrating lens design with digital camera simulation*, 5678 SPIE Proceedings SPIE Electronic Imaging, San Jose, CA, Feb. 2005, pp. 48-58.

* cited by examiner

| Surface | Type | Curvature | Thickness | Glass | Semi-Diameter |
|---|---|---|---|---|---|
| 0 | STANDARD | | 1.15E+02 | | 2.90E+02 |
| 1 | EVENASPH | 2.97E-02 | -7.92E+01 | MIRROR | 3.72E+01 |
| 2 | STANDARD | 0.00E+00 | -3.43E+00 | | 2.50E+00 |
| 3 | STANDARD | 2.22E-01 | -1.90E+00 | SF4 | 3.29E+00 |
| 4 | STANDARD | 5.47E-02 | -2.82E-01 | | 5.01E+00 |
| 5 | STANDARD | 3.18E-02 | -2.68E+00 | N-LASF44 | 5.54E+00 |
| 6 | STANDARD | 1.26E-01 | -3.49E-01 | | 5.87E+00 |
| 7 | EVENASPH | -5.57E-02 | -3.29E+00 | N-PSK57 | 6.87E+00 |
| 8 | EVENASPH | 7.89E-02 | -5.71E+00 | | 6.87E+00 |
| 9 | STANDARD | -3.43E-02 | -2.34E+00 | SF66 | 5.26E+00 |
| 10 | STANDARD | -1.11E-01 | -3.34E+00 | | 4.64E+00 |
| 11 | EVENASPH | -7.27E-02 | -2.68E+00 | E48R | 5.19E+00 |
| 12 | EVENASPH | -3.88E-02 | -2.30E+00 | | 5.02E+00 |
| 13 | STANDARD | | -1.50E+00 | BK7 | 5.12E+00 |
| 14 | STANDARD | | -1.00E+00 | | 5.18E+00 |
| 15 | STANDARD | | 0.00E+00 | | 5.23E+00 |

| Surface | Conic | 4th Order | 6th Order | 8th Order | 10th Order | 12th Order | 14th Order |
|---|---|---|---|---|---|---|---|
| 1 | -6.05E+00 | 8.01E-07 | -2.78E-09 | 4.13E-12 | -3.40E-15 | 1.47E-18 | -2.61E-22 |
| 7 | -1.12E+00 | 2.75E-05 | -1.02E-07 | | | | |
| 8 | -2.32E+00 | -9.08E-05 | 1.55E-07 | | | | |
| 11 | 2.56E+00 | | | | | | |
| 12 | | -2.86E-04 | 3.69E-06 | -1.03E-07 | | | |

Figure 9b

Red Filter Kernel

| 0.0077 | -0.0012 | -0.0176 | -0.0215 | 0.0187 | -0.0215 | -0.0176 | -0.0012 | 0.0077 |
|---|---|---|---|---|---|---|---|---|
| -0.0032 | -0.0257 | 0.019 | 0.0553 | 0.0016 | 0.0553 | 0.019 | -0.0257 | -0.0032 |
| -0.0124 | 0.0164 | 0.08 | -0.0108 | -0.0119 | -0.0108 | 0.08 | 0.0164 | -0.0124 |
| -0.0101 | 0.045 | -0.0415 | -0.3821 | -0.353 | -0.3821 | -0.0415 | 0.045 | -0.0101 |
| -0.0175 | 0.0614 | -0.125 | 0.0227 | 2.3584 | 0.0227 | -0.125 | 0.0614 | -0.0175 |
| -0.0083 | 0.034 | -0.0432 | -0.2573 | 0.4669 | -0.2573 | -0.0432 | 0.034 | -0.0083 |
| -0.0064 | 0.0142 | 0.0435 | -0.0831 | -0.3126 | -0.0831 | 0.0435 | 0.0142 | -0.0064 |
| -0.0048 | -0.0077 | 0.0158 | 0.0426 | 0.1509 | 0.0426 | 0.0158 | -0.0077 | -0.0048 |
| 0.0048 | -0.0067 | -0.0057 | -0.0005 | -0.062 | -0.0005 | -0.0057 | -0.0067 | 0.0048 |

Green Filter Kernel

| -0.001 | 0.0001 | -0.0017 | 0.0015 | 0.0343 | 0.0015 | -0.0017 | 0.0001 | -0.001 |
|---|---|---|---|---|---|---|---|---|
| 0.0001 | -0.0013 | -0.001 | -0.0131 | -0.0708 | -0.0131 | -0.001 | -0.0013 | 0.0001 |
| -0.0009 | -0.0015 | -0.0029 | 0.0218 | 0.0995 | 0.0218 | -0.0029 | -0.0015 | -0.0009 |
| 0.0008 | -0.0053 | 0.0059 | -0.1107 | -0.3095 | -0.1107 | 0.0059 | -0.0053 | 0.0008 |
| -0.0053 | 0.0089 | -0.0433 | -0.0264 | 1.6244 | -0.0264 | -0.0433 | 0.0089 | -0.0053 |
| -0.0008 | 0.0002 | -0.0134 | -0.0753 | 0.3583 | -0.0753 | -0.0134 | 0.0002 | -0.0008 |
| 0 | -0.0013 | 0.0034 | -0.0278 | -0.2009 | -0.0278 | 0.0034 | -0.0013 | 0 |
| -0.0004 | 0 | -0.0016 | 0.0082 | 0.0963 | 0.0082 | -0.0016 | 0 | -0.0004 |
| -0.0003 | -0.0004 | 0.001 | -0.0011 | -0.0476 | -0.0011 | 0.001 | -0.0004 | -0.0003 |

Blue Filter Kernel

| -0.0084 | -0.0071 | -0.0029 | -0.0003 | 0.0021 | -0.0003 | -0.0029 | -0.0071 | -0.0084 |
|---|---|---|---|---|---|---|---|---|
| -0.0119 | 0.0117 | 0.0274 | 0.0317 | 0.0372 | 0.0317 | 0.0274 | 0.0117 | -0.0119 |
| -0.0042 | 0.0469 | 0.0411 | -0.0832 | -0.1207 | -0.0832 | 0.0411 | 0.0469 | -0.0042 |
| 0.0047 | 0.0515 | -0.1832 | -0.3947 | -0.0686 | -0.3947 | -0.1832 | 0.0515 | 0.0047 |
| 0.0061 | 0.0533 | -0.2835 | 0.3722 | 2.1628 | 0.3722 | -0.2835 | 0.0533 | 0.0061 |
| 0.0101 | 0.048 | -0.2809 | -0.0209 | 0.9934 | -0.0209 | -0.2809 | 0.048 | 0.0101 |
| 0.0047 | 0.0712 | -0.1074 | -0.3669 | -0.3331 | -0.3669 | -0.1074 | 0.0712 | 0.0047 |
| -0.0123 | 0.0643 | 0.0779 | 0.003 | -0.0092 | 0.003 | 0.0779 | 0.0643 | -0.0123 |
| -0.0275 | -0.0159 | 0.0198 | 0.037 | 0.0316 | 0.037 | 0.0198 | -0.0159 | -0.0275 |

Figure 9c

| Surface | Type | Curvature | Thickness | Glass | Semi-Diameter |
|---|---|---|---|---|---|
| 0 | STANDARD | | 1.10E+02 | | 2.90E+02 |
| 1 | EVENASPH | 2.79E-02 | -7.49E+01 | MIRROR | 4.04E+01 |
| 2 | STANDARD | | -2.58E+00 | | 2.06E+00 |
| 3 | FZERNSAG | 2.21E-01 | -1.24E+00 | POLYCARB | 2.79E+00 |
| 4 | STANDARD | 2.12E-02 | -4.21E-01 | | 4.19E+00 |
| 5 | STANDARD | 6.58E-02 | -2.25E+00 | N-LAK33 | 4.21E+00 |
| 6 | STANDARD | 1.91E-01 | -6.05E-01 | | 4.47E+00 |
| 7 | STANDARD | -4.04E-02 | -2.50E+00 | N-PSK57 | 5.91E+00 |
| 8 | STANDARD | 8.74E-02 | -3.55E+00 | | 5.93E+00 |
| 9 | STANDARD | -7.68E-02 | -1.81E+00 | SF59 | 4.84E+00 |
| 10 | STANDARD | -1.46E-01 | -6.30E+00 | | 4.20E+00 |
| 11 | STANDARD | | -1.50E+00 | BK7 | 5.05E+00 |
| 12 | STANDARD | | -1.00E+00 | | 5.22E+00 |
| 13 | STANDARD | | 0.00E+00 | | 5.40E+00 |

| Surface | Conic | 4th Order | 6th Order | 8th Order |
|---|---|---|---|---|
| 1 | -6.48E+00 | -2.83E-08 | -8.41E-11 | 1.97E-14 |
| 3 | 9.36E-01 | | | |

| Surface | $z_1$ | $z_2$ | $z_3$ | $z_4$ | $z_5$ | $z_6$ |
|---|---|---|---|---|---|---|
| 3 | 1.60E+01 | 1.00E+00 | -1.98E-01 | 8.80E-04 | 2.23E-04 | -1.40E-03 |
| | $z_7$ | $z_8$ | $z_9$ | $z_{10}$ | $z_{11}$ | $z_{12}$ |
| | 8.55E-05 | 2.15E-06 | -3.16E-05 | 9.15E-06 | 2.01E-04 | -4.20E-05 |
| | $z_{13}$ | $z_{14}$ | $z_{15}$ | $z_{16}$ | $z_{17}$ | $z_{18}$ |
| | -2.15E-05 | -1.10E-06 | -1.98E-07 | 2.45E-07 | 1.15E-06 | -6.80E-07 |

Figure 13b

| Surface | Type | Curvature | Thickness | Glass | Semi-Diameter |
|---|---|---|---|---|---|
| 0 | STANDARD | 0.00E+00 | 1.10E+02 | | 2.90E+02 |
| 1 | EVENASPH | 2.84E-02 | -7.66E+01 | MIRROR | 3.84E+01 |
| 2 | STANDARD | 0.00E+00 | -2.87E+00 | | 1.93E+00 |
| 3 | EVENASPH | 1.86E-01 | -1.01E+00 | POLYCARB | 2.75E+00 |
| 4 | STANDARD | 3.33E-02 | -8.28E-01 | | 3.82E+00 |
| 5 | STANDARD | 6.12E-02 | -2.63E+00 | LAFN28 | 4.37E+00 |
| 6 | STANDARD | 1.79E-01 | -5.00E-01 | | 4.75E+00 |
| 7 | STANDARD | -8.89E-02 | -3.20E+00 | N-LAF35 | 5.56E+00 |
| 8 | STANDARD | 4.40E-02 | -1.29E+00 | | 5.40E+00 |
| 9 | STANDARD | 3.25E-02 | -3.21E+00 | SF66 | 4.60E+00 |
| 10 | STANDARD | -9.16E-02 | -2.22E+00 | | 3.93E+00 |
| 11 | STANDARD | 1.07E-01 | -1.50E+00 | E48R | 3.95E+00 |
| 12 | STANDARD | 1.19E-01 | -3.64E+00 | | 4.30E+00 |
| 13 | STANDARD | 0.00E+00 | -1.50E+00 | BK7 | 4.96E+00 |
| 14 | STANDARD | 0.00E+00 | -1.00E+00 | | 5.10E+00 |
| 15 | STANDARD | 0.00E+00 | 0.00E+00 | | 5.24E+00 |

| Surface | Conic | 4th Order | 6th Order | 8th Order |
|---|---|---|---|---|
| 1 | -5.47E+00 | -7.11E-07 | 3.42E-10 | -6.41E-14 |
| 3 | 1.73E+00 | 7.85E-04 | 1.31E-05 | |
| 11 | 1.83E+00 | | | |
| 12 | -3.30E+00 | | | |

Figure 14b

| Surface | Type | Curvature | Thickness | Glass | Semi-Diameter |
|---|---|---|---|---|---|
| 0 | STANDARD | 0.00E+00 | 1.05E+02 | | 2.80E+02 |
| 1 | EVENASPH | 2.85E-02 | -7.81E+01 | MIRROR | 3.97E+01 |
| 2 | STANDARD | 0.00E+00 | -2.85E+00 | | 2.08E+00 |
| 3 | EVENASPH | 1.79E-01 | -9.96E-01 | POLYCARB | 2.86E+00 |
| 4 | STANDARD | 6.11E-02 | -7.49E-01 | | 3.90E+00 |
| 5 | STANDARD | 7.50E-02 | -2.39E+00 | N-LAF34 | 4.40E+00 |
| 6 | STANDARD | 1.86E-01 | -5.02E-01 | | 4.68E+00 |
| 7 | STANDARD | -1.12E-01 | -2.91E+00 | N-LAK14 | 5.37E+00 |
| 8 | STANDARD | 2.10E-02 | -6.05E-01 | | 5.19E+00 |
| 9 | STANDARD | -1.17E-02 | -3.21E+00 | SF66 | 4.69E+00 |
| 10 | STANDARD | -1.44E-01 | -3.39E+00 | | 3.60E+00 |
| 11 | STANDARD | 2.21E-01 | -1.00E+00 | BK1 | 3.61E+00 |
| 12 | STANDARD | 9.84E-02 | -4.99E-01 | | 4.33E+00 |
| 13 | STANDARD | -8.67E-02 | -1.84E+00 | N-LAK10 | 5.31E+00 |
| 14 | STANDARD | -6.74E-05 | -4.95E-01 | | 5.29E+00 |
| 15 | STANDARD | 0.00E+00 | -1.50E+00 | BK7 | 5.25E+00 |
| 16 | STANDARD | 0.00E+00 | -1.00E+00 | | 5.19E+00 |
| 17 | STANDARD | 0.00E+00 | 0.00E+00 | | 5.12E+00 |

| Surface | Conic | 4th Order | 6th Order | 8th Order |
|---|---|---|---|---|
| 1 | -5.75E+00 | -5.05E-07 | 1.74E-10 | -2.01E-14 |
| 3 | 1.88E+00 | 8.59E-04 | 3.56E-05 | |

Figure 15b

CATADIOPTRIC IMAGING SYSTEM

BACKGROUND OF THE INVENTION

1. Field of the Invention

This invention relates generally to catadioptric imaging systems, including for example offset systems for imaging documents.

2. Description of the Related Art

To achieve a high-resolution image of a paper document, current desktop document imaging systems typically either perform some form of mechanical scanning, use a large working focal distance, and/or operate on-axis (i.e., the document is centered on and perpendicular to the optical axis of the imaging system). Current desktop document imagers can generally be classified into two broad categories: traditional document scanners and "tall" document imagers.

FIG. 1 shows an example of a traditional document scanner. The document is placed on the scan surface and a scan mechanism is mechanically scanned across the document. The device relies on mechanical scanning to create a two-dimensional image using a one-dimensional image capture device. The mechanical flatbed document scanner has several disadvantages. First, the scanning process is slow and noisy. Second, the document scanner is bulky, which reduces its portability and makes it unattractive as a desktop accessory. Third, the device consumes more power due to the mechanical scanning process.

FIG. 2 shows an example of a "tall" document imager. In these systems, the document image is captured using a two-dimensional image capture device located sufficiently far away from the paper document. Such a system requires a fairly long working distance from the document, so the camera's optical axis can be both perpendicular to and centered on the document. Reducing the operating height for such a perpendicular imaging system typically requires a wide angle imaging system, which would introduce severe barrel distortions at large field angles (i.e. along the outer boundaries of the document).

Some imaging systems, such as whiteboard capture imaging systems, have an optical subsystem which is not perpendicular to the document surface, allowing a lower system height. These imaging systems, however, create undesirable keystoning of the optical image. This keystoning is unacceptably deleterious for many paper document imaging applications, as it introduces a variable image resolution over the document. The foreshortening of the image can reduce the document scanning resolution considerably.

FIG. 3 illustrate the deleterious effects of distortion. FIG. 3a visualizes a two-dimensional sensor array (grid) overlayed on a severely distorted image of a document, such as would be produced by a conventional wide-angle lens system. While the sensor may achieve the targeted resolution at the center of the image, at the periphery the image resolution is severely compromised due to the geometric distortion. FIG. 3b shows a two-dimensional sensor array (grid) overlayed on a document image with significant keystoning. In this case, the document may achieve the targeted resolution at one edge of the document, but the foreshortening reduces the resolution dramatically at the opposite edge.

Thus, there is a need for document imaging systems that overcome some or all of these drawbacks. Such systems preferably should avoid mechanical scanning and should have a relatively short working distance and small overall size.

SUMMARY OF THE INVENTION

The present invention overcomes the limitations of the prior art by providing a catadioptric imaging system that combines a convex rectifying mirror, a lens system and subsequent image processing.

In one application, an offset catadioptric imaging system is designed to image an 8.5"×11" object field at 300 dpi resolution or better, and preferably in color. The system includes, in order along an optical path from an object field to a corresponding image field: a convex mirror, a lens system and an image sensor. The convex mirror and the lens system act in concert to image the object field onto the image sensor. The convex mirror defines an optical axis. The system is offset in that the image sensor and the object field are positioned on opposite sides of the optical axis. An image processor provides additional correction of the image captured by the image sensor. The overall system preferably is small and portable, for example having a height of not more than 5".

In one variation, the aperture stop is located between the convex mirror and the lens system. In another variation, the lens system has zoom capability, for example by moving various lens elements relative to each other. In another variation, the system also includes a light source that directs light in the opposite direction to illuminate the object field.

In another aspect of the invention, the convex mirror and lens system together are designed so they have an MTF that remains above zero at least out to a Nyquist frequency for the image sensor. One example of image processing is the use of Wiener filters or other types of field-dependent linear filters to correct for aberrations not compensated by the convex mirror and lens system. Image processing can also be used to correct for uneven illumination across the object field.

In other aspects, a catadioptric imaging system includes, in order along an optical path from an object field to a corresponding image field: a convex mirror, a lens system and an image sensor. The convex mirror (e.g., a rectifying mirror) and the lens system act in concert to image the object field onto the image sensor. The lens system includes a first negative lens group, a second positive lens group and a third negative lens group. Alternately, the lens system includes a first negative lens element, a second positive lens element, a third positive lens element and a fourth negative lens element. Example designs include four-, five- and six-element designs that meet the requirements of the document imaging application described above. The elements may or may not be rotationally symmetric and may or may not include aspheres. Image processing can be used to increase contrast, as above.

Other aspects of the invention include systems and applications for the above, and methods corresponding to all of the foregoing.

BRIEF DESCRIPTION OF THE DRAWINGS

The invention has other advantages and features which will be more readily apparent from the following detailed description of the invention and the appended claims, when taken in conjunction with the accompanying drawings, in which:

FIG. 9b is a table of the optical prescription for the lens system of FIG. 9a.

FIG. 9c are tables of the image processing filters used with the lens system of FIG. 9a.

FIGS. 13a-13d are a cross-section, optical prescription and field curvature and distortion curves for a four-element lens system according to the invention.

FIGS. 14a-14d are a cross-section, optical prescription and field curvature and distortion curves for a five-element lens system according to the invention.

FIGS. 15a-15d are a cross-section, optical prescription and field curvature and distortion curves for a six-element lens system according to the invention.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Figure 2:
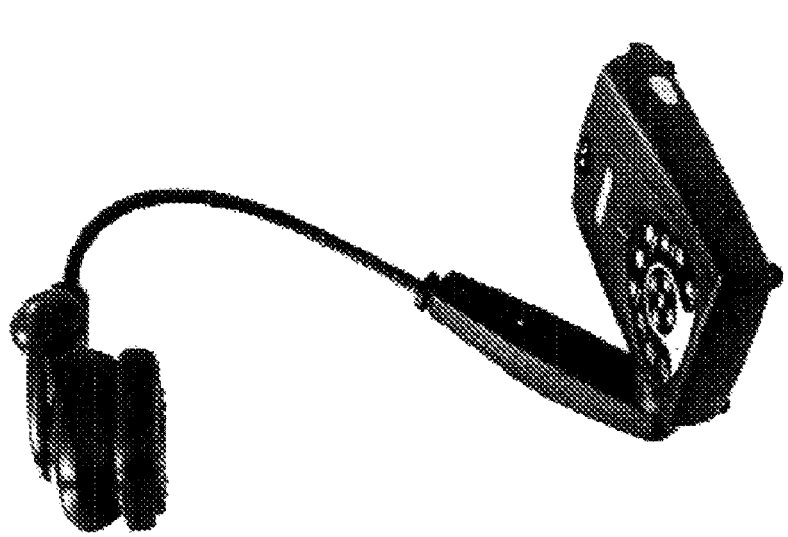
FIG. 2 (prior art) shows a tall document imager.
Figure 1:
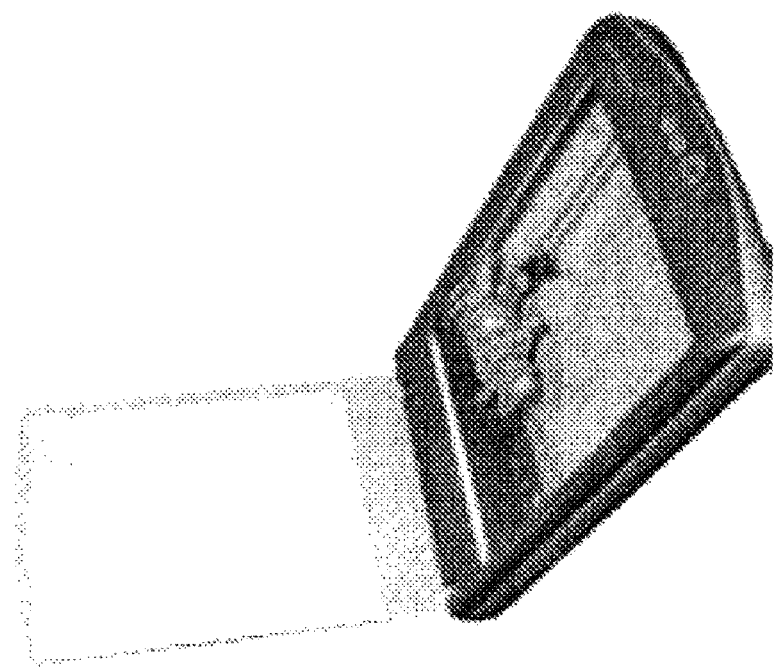
FIG. 1 (prior art) shows a traditional document scanner.
Figures 3A, 3B:
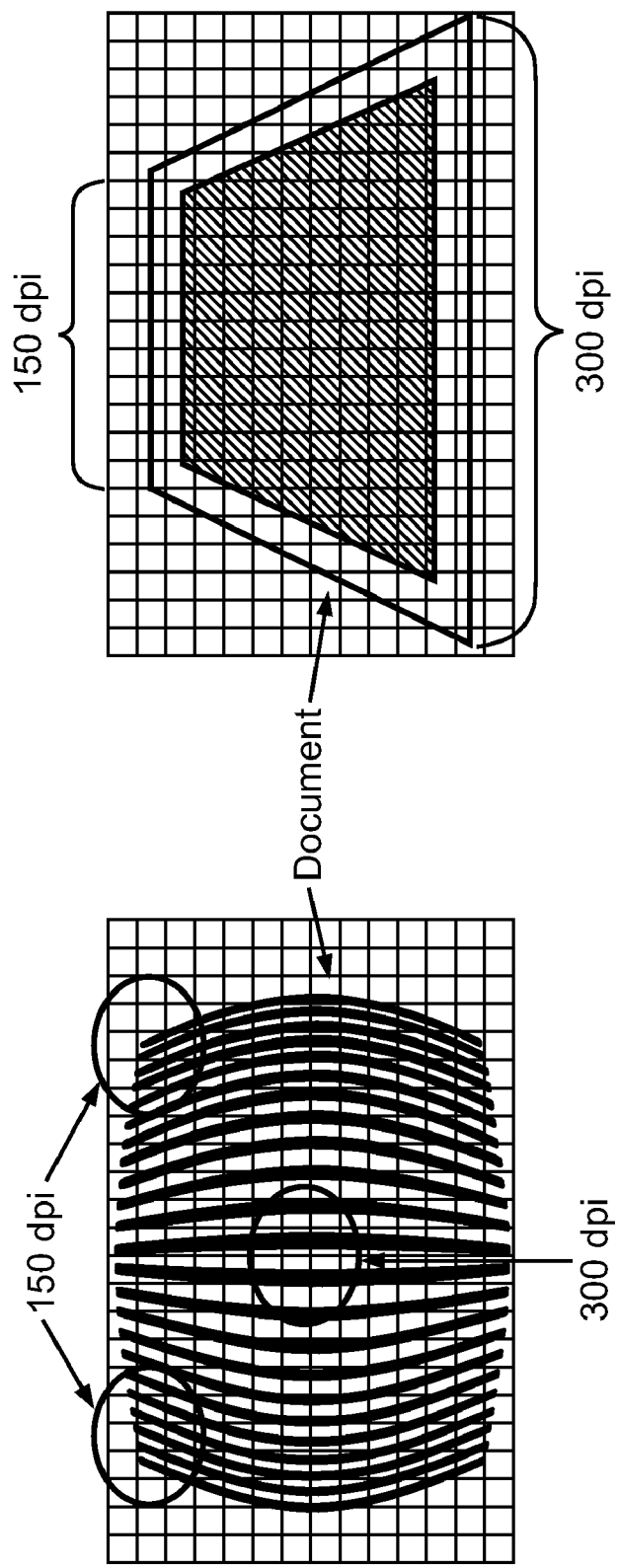
FIGS. 3a and 3b (prior art) illustrate the effect of distortion on resolution.
Figure 4:
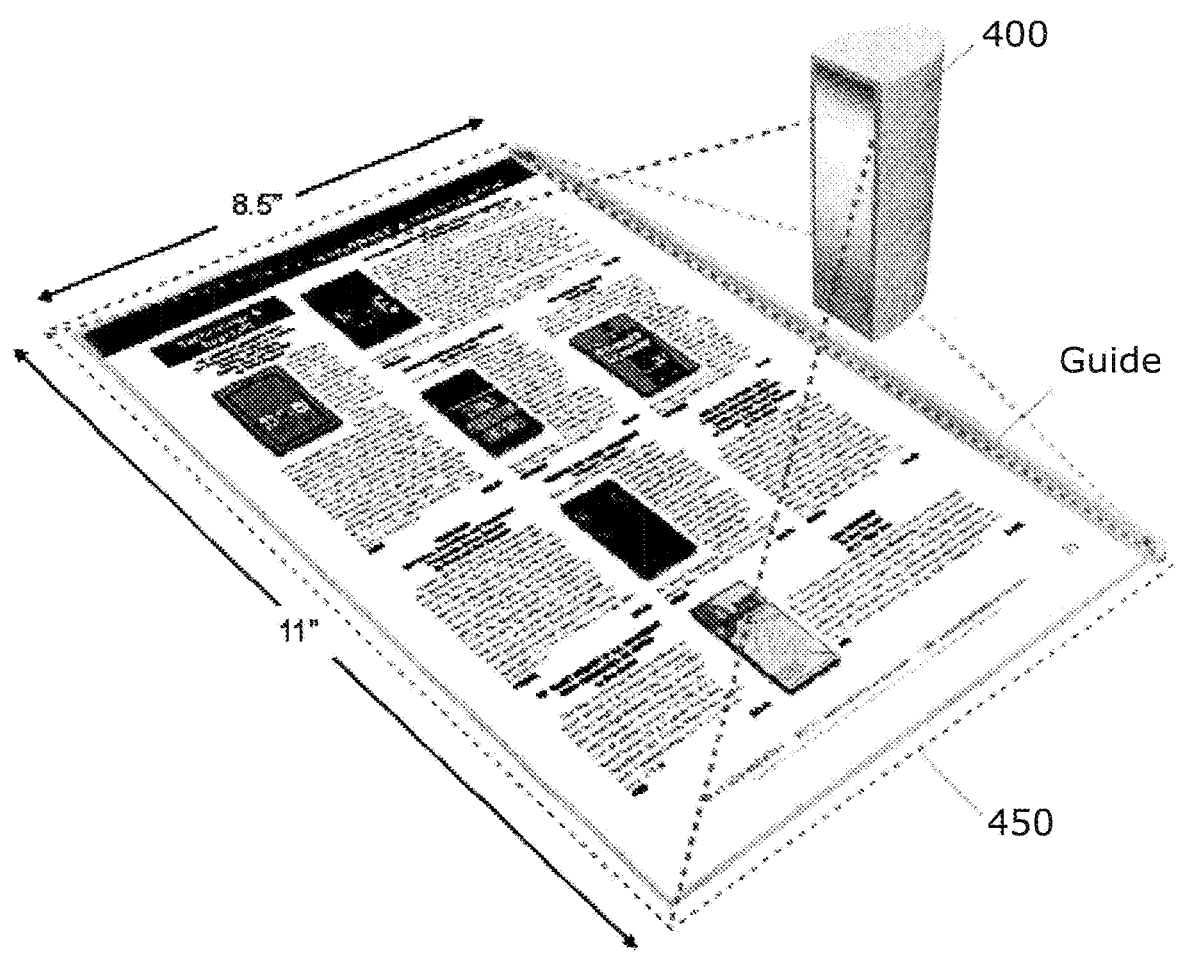
FIG. 4 is a perspective view of an offset document imaging system according to the invention.

FIG. 4 shows a perspective view of an offset document imaging system 400 according to the invention. This particular imager 400 is capable of capturing a 300 dpi full-color image of the 8.5"×11" document 450 with a single snapshot, eliminating the need for mechanical scanning. The document 450 is placed next to the small-form factor document imaging system 400, as opposed to the traditional geometries shown in FIGS. 1 and 2.

Figure 5:
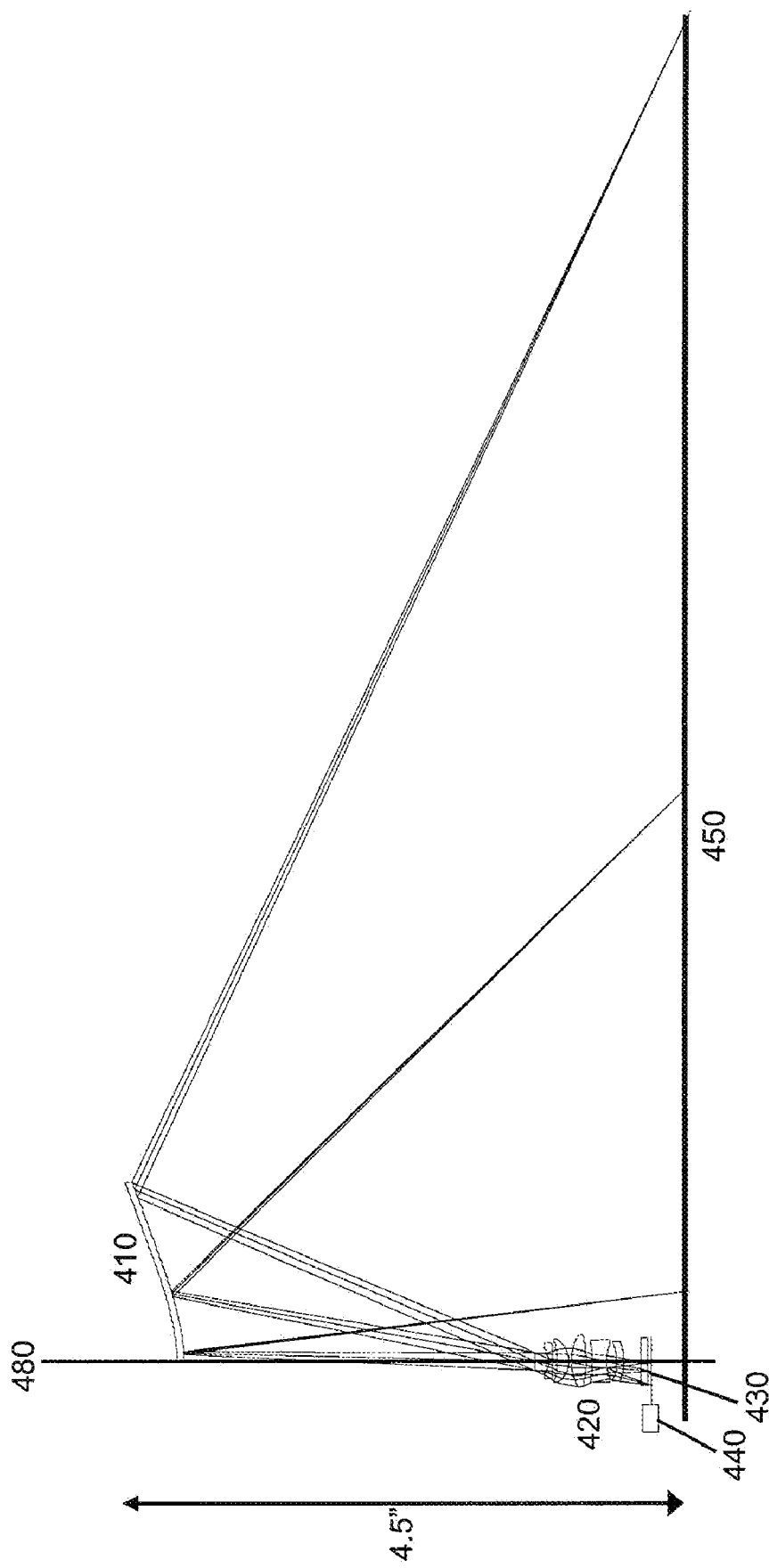
FIG. 5 is a cross-sectional view of the imaging system of FIG. 4, illustrating the optical operation of the system.

FIG. 5 is a cross-sectional view of the imaging system 400 of FIG. 4, illustrating the optical operation of the system. The imaging system 400 includes a convex mirror 410, a lens system 420 and an image sensor 430. The convex mirror 410 and lens system 420 together image the document 450 onto the image sensor 430. An image processor 440 can be used to further process the image captured by the image sensor 430. For example, field-dependent spatial filters could be used to sharpen the image. The image sensor 430 and/or image processor 440 can further communicate to other computing devices via a communications port (not shown), for example USB or a wireless connection.

In this design, the convex mirror 410 is rotationally symmetric about optical axis 480. The system 400 is offset in the sense that the object field 450 is not centered on the optical axis, as is typically the case in the tall document imagers of FIG. 1. In the design of FIG. 5, the object field 450 lies entirely to one side of the optical axis 480 and the image sensor 430 lies entirely to the other side of the optical axis.

Figure 6B:
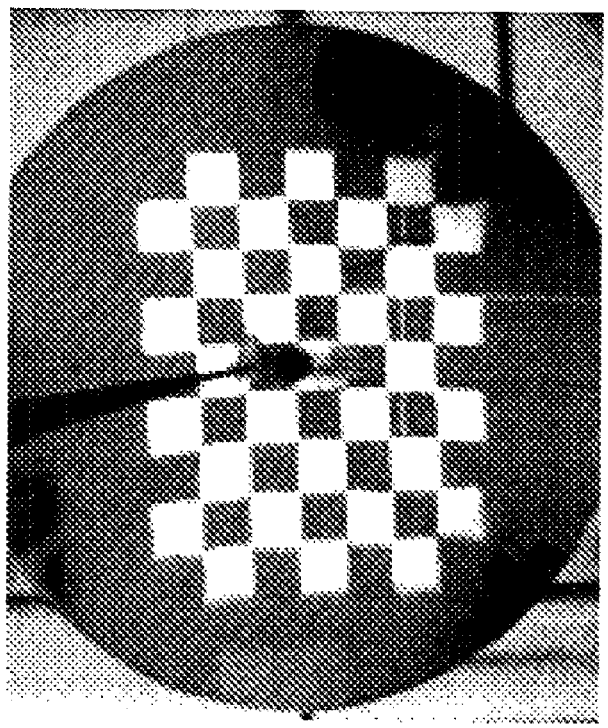
FIG. 6b shows a reflected image from a rectifying mirror.
Figure 6A:
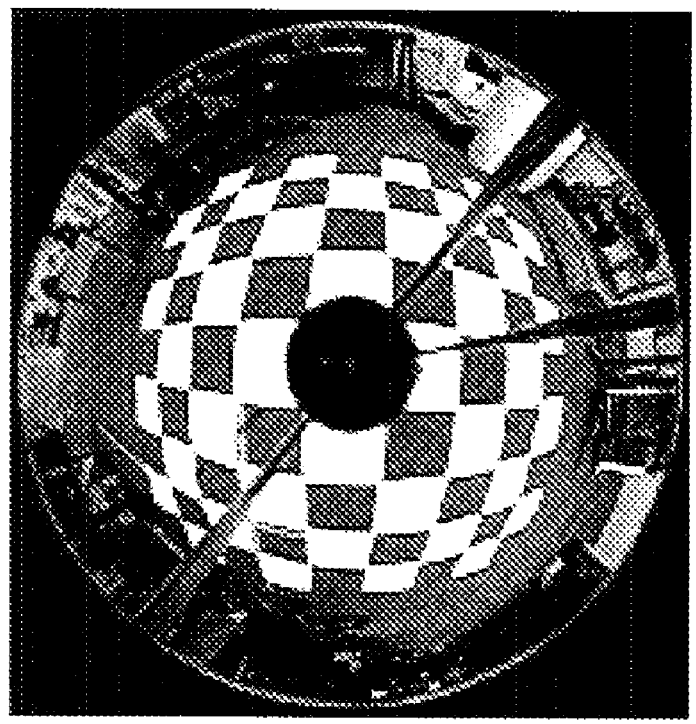
FIG. 6a shows a reflected image from a standard wide-angle catadioptric imaging system.

The mirror 410 is a rectifying mirror that substantially avoids the distortion common to refractive-only wide-angle optical systems. FIG. 6 illustrates this effect. FIG. 6a shows a reflected image used in standard wide-angle catadioptric imaging system. The image contains significant geometric distortion. FIG. 6b shows a reflected image from a rectifying mirror. The distortion is significantly reduced.

Figure 7B:
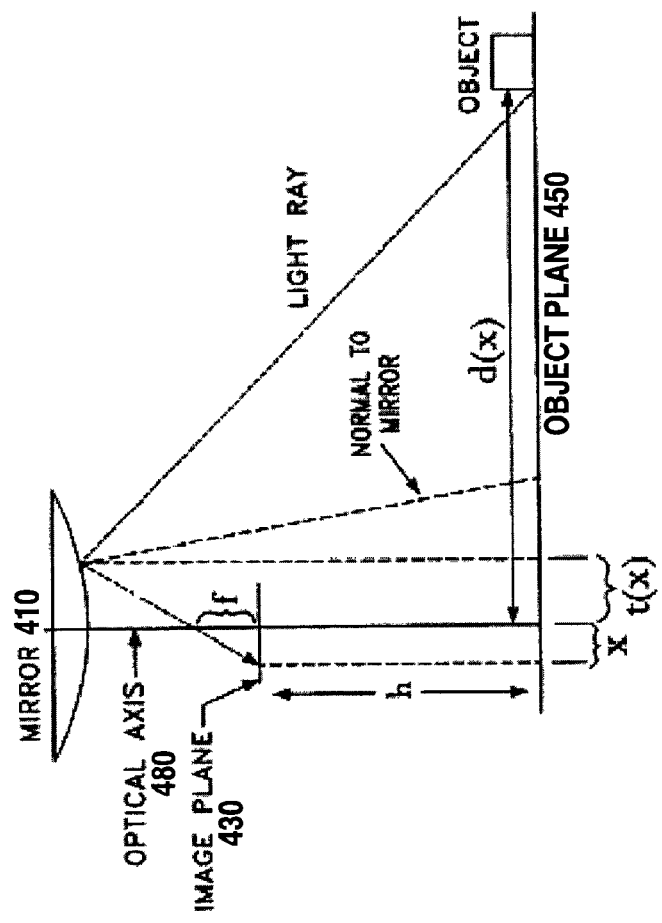
FIGS. 7a and 7b define variables used to specify a perfectly-rectifying mirror.
Figure 7A:
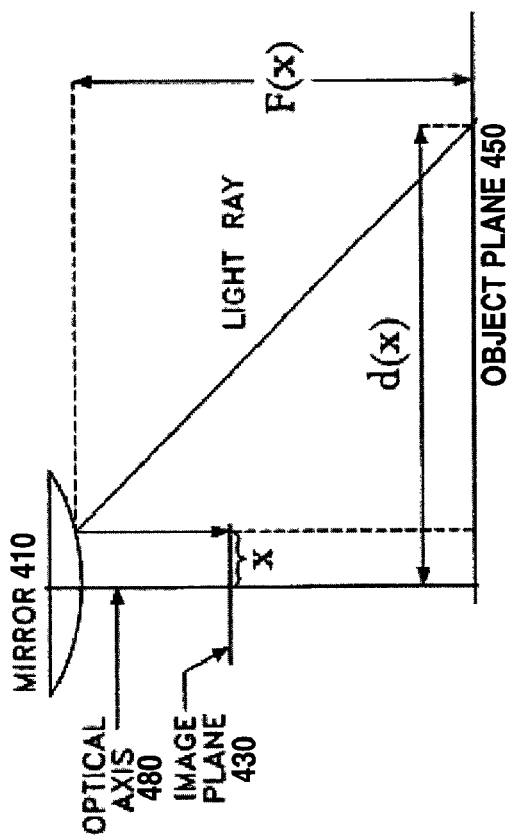

A perfectly rectifying mirror for a pinhole camera can be designed using the approach described in U.S. Pat. No. 6,412, 961, which is incorporated herein by reference. In this approach, the rotationally symmetric mirror 410 has a figure $F(x)$ that satisfies $$\frac{2F'(x)}{1-F'(x)^2} = \frac{d(x)-x}{F(x)} \quad (1)$$

where a ray that leaves an object point at radius $d(x)$ hits both the mirror and the image plane at a radius x (recall that for a pinhole camera, only one ray travels from the object point to the image point). See FIG. 7a. If $d(x)$ is a linear function, i.e., $d(x)=ax$ where a is constant, then the system will be free of distortion.

In an alternate approach, the rotationally symmetric mirror 410 has a figure $F(t)$ that satisfies $$\frac{\frac{x}{f} + \frac{2F'(t)}{1-F'(t)^2}}{1 - \frac{x}{f}\frac{2F'(t)}{1-F'(t)^2}} = \frac{d(x)-t}{F(t)} \quad (2)$$

where a ray that leaves an object point at radius $d(x)$ hits the mirror at radius $t(x)$ and is reflected to the image plane at a radius x, again assuming a pinhole camera. f is the focal length, which by geometry is given by $F(t)=f+h+f/xt$, where h is the distance along the optical axis from the object plane 450 to the image plane 430. See FIG. 7b.

The mirrors defined by Eqns. (1) and (2) map equally-spaced regions in the object space 450 into equally-spaced regions on the image plane 430 for a pinhole camera. However, this is strictly true only for a pinhole camera, where only one ray propagates from each object point to the corresponding image point. In real systems, opening up the aperture will introduce aberrations that will blur the image. The lens system 420 and image processor 440 can be used to reduce this blur. As a result, it is not necessary (and may be detrimental) to use mirrors having exactly the figures defined by Eqns. (1) or (2).

FIGS. 8-15 describe various lens systems 420 that can be used in the document imaging system of FIGS. 4-5. In these examples, the system uses 180 degrees of a rotationally-symmetric mirror 410 which acts to rectify the image field. The mirror is similar in function to those described in Eqns. (1) and (2) above. However, the mirror is designed in conjunction with the lens system 420 and image processor 440 to achieve the desired final image quality. As a result, the mirror 410 does not have the exact figure given by the closed-form expressions (1) or (2).

The lens system 420 generally contains three lens groups. In order from the mirror 410 to the sensor 420, they are a negative lens group 510, a positive lens group 520 and another negative lens group 530, although the number of lens elements in each lens group and the specific designs of the lens elements may vary from one design to the next. The term "lens element" is intended to mean a single lens, excluding for example two lenses separated by air (which would be referred to as a lens group) and also two lenses cemented together (e.g., a doublet). The aperture stop 415 is located between the mirror 410 and the lens system 420.

Figure 8:
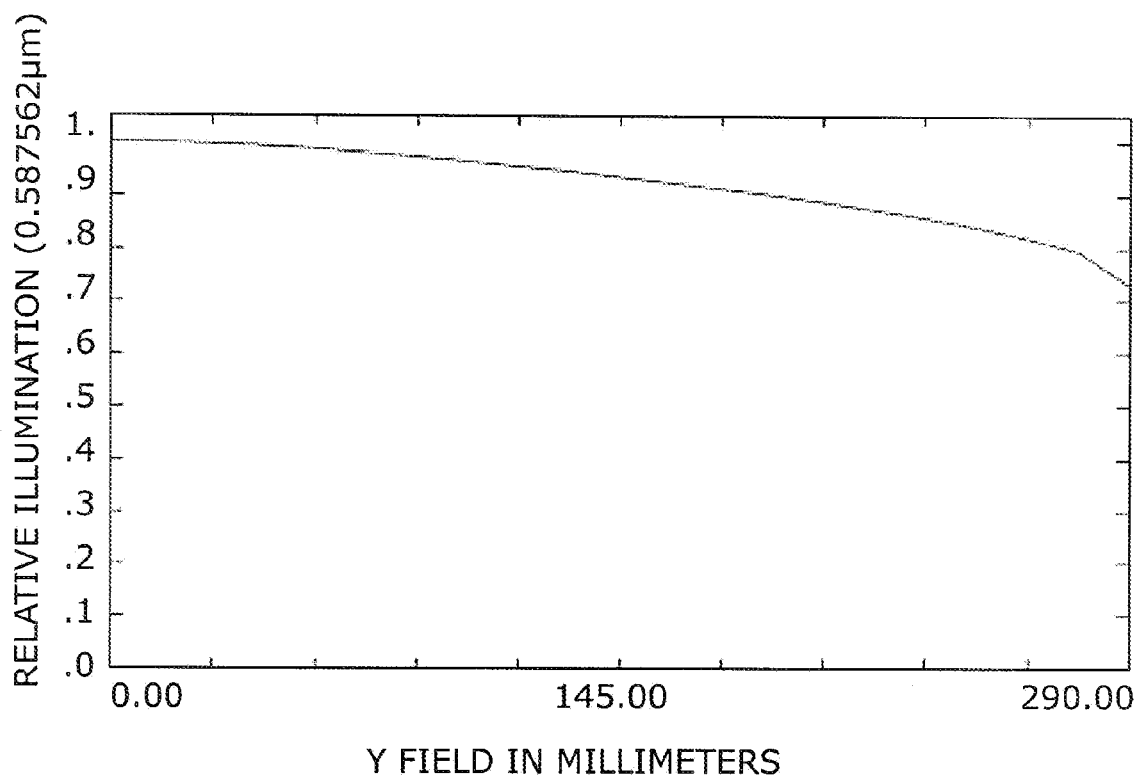
FIG. 8 is a graph that shows illumination rolloff for an example system.

The image processing 440 in this example includes two steps. The first step corrects for uneven illumination across the field of view. Wide angle systems suffer a certain amount of illumination rolloff. The relative illumination curve for the current design is shown in FIG. 8. The illumination falls to about 75 percent at the far corners of the 8.5"×11" document. The image processing subsystem 440 applies a simple gain factor to correct this. Second, the image processing 440 restores contrast using field-dependent linear sharpening filters specially tuned to the point spread function of the catadioptric optical system.

This example design is based on a 1/6 inch 8 megapixel CMOS image sensor 430 manufactured by Micron. The design scales appropriately for different image sensors (e.g., by Sharp, Kodak, etc.) of the same class. The reference sensor 430 uses 1.75 micron pixels. Thus, the overall imaging system must achieve resolution out to the Nyquist rate of 280 lp/mm. Such resolution requirements are extremely challenging. For example, the optical system must be F/2.8 or faster just to ensure that the targeted 300 dpi resolution is within the diffraction limit. Larger image sensors 430 with larger pixels can be used to reduce the resolution requirements. However, if the overall system height is held constant, then the illumination tends to rolloff very significantly due to the increase in the chief ray angle.

In this particular design, the mirror 410 and sensor 430 preferably are separated by 5" or less along the optical axis, so that the overall device can be a small form factor. In FIG. 4, the overall device housing is shown as 4.5" total height. Small form factors allow the device to be easily portable. At this height and at a resolution of 300 dpi across an 8.5"×11" object field, the half field of view of the entire system is approximately 60 degrees (or more, for shorter systems) and the field of view of an individual pixel in the sensor is approximately 0.02-0.03 degrees.

Figure 9A:
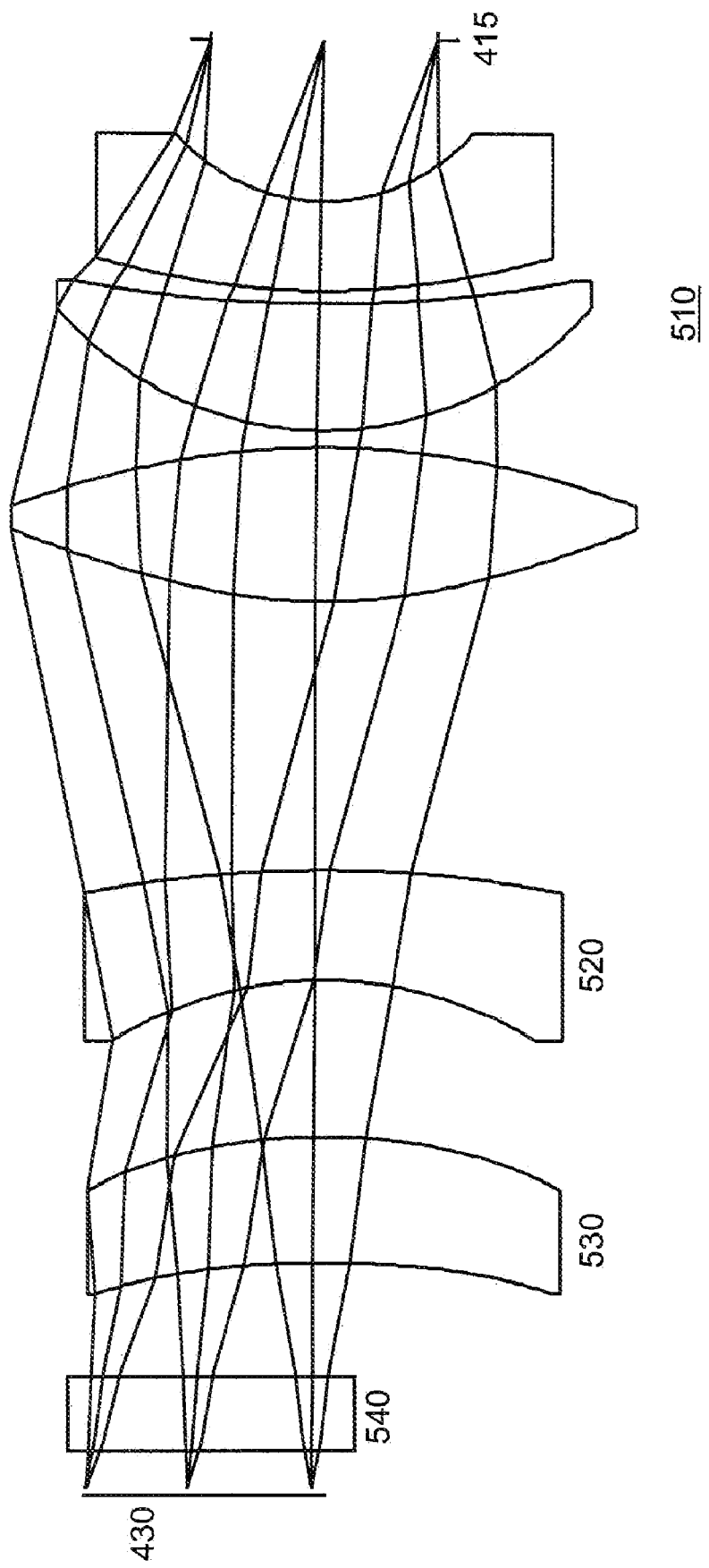
FIG. 9a is a cross-section of a five-element lens system according to the invention.

FIG. 9a is a cross-section of a first lens system 420 according to the invention. This lens system 420 includes the three lens groups 510, 520 and 530, containing five lens elements total. The first lens group 510 is the positive lens group containing the first three lens elements. The second lens group 520 is the single negative lens and the third lens group 530 is the aspherical positive lens element which acts to minimize the chief ray angle. Object 540 is an IR filter/cover glass for the sensor 430. This example uses only rotationally-symmetric lens elements. The third and fifth elements are aspheres. The optical prescription is given in FIG. 9b.

This design is capable of changing focal length to account for varying document height. For instance, if the document is sitting atop a stack of documents 1 cm thick, the lens system is capable of shifting both the fourth and fifth lens elements 520, 530 to zoom away from the document ensuring 300 dpi scanning over the entire page.

To achieve these difficult design requirements, the digital image processing subsystem 440 corrects certain shortcomings in the optical subsystem. In addition to the field-dependent gain that is applied to correct for uneven illumination, digital filters are also applied to the images captured by the image sensor 430 to restore contrast. In this case, 9×9 digital spatial filters are used. FIG. 9c lists the filter coefficients for the sharpening filters used on the red, green and blue images, respectively near the optical axis.

Figure 10:
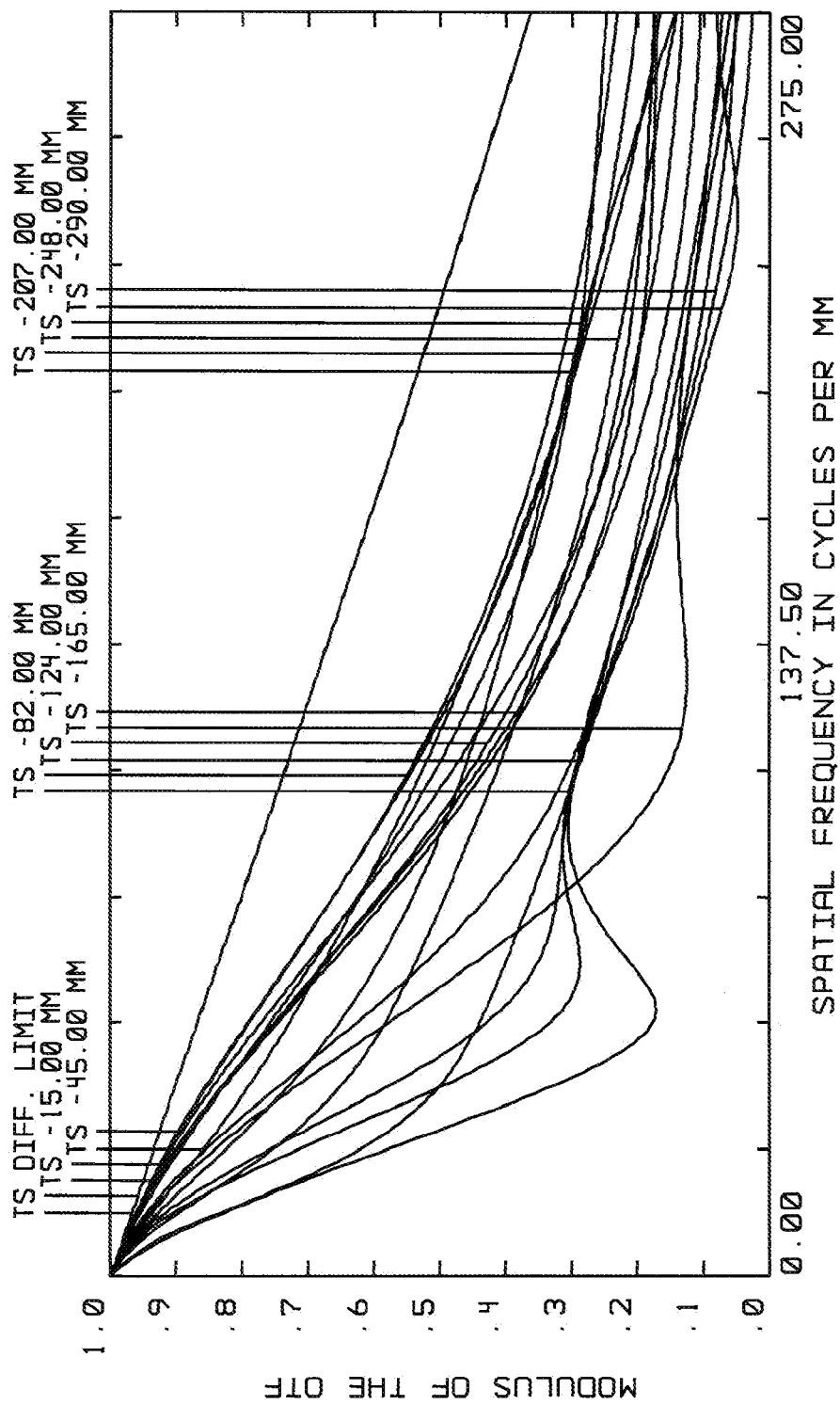
FIG. 10 graphs MTFs of the catadioptric optical system at a red wavelength.
Figure 11A:
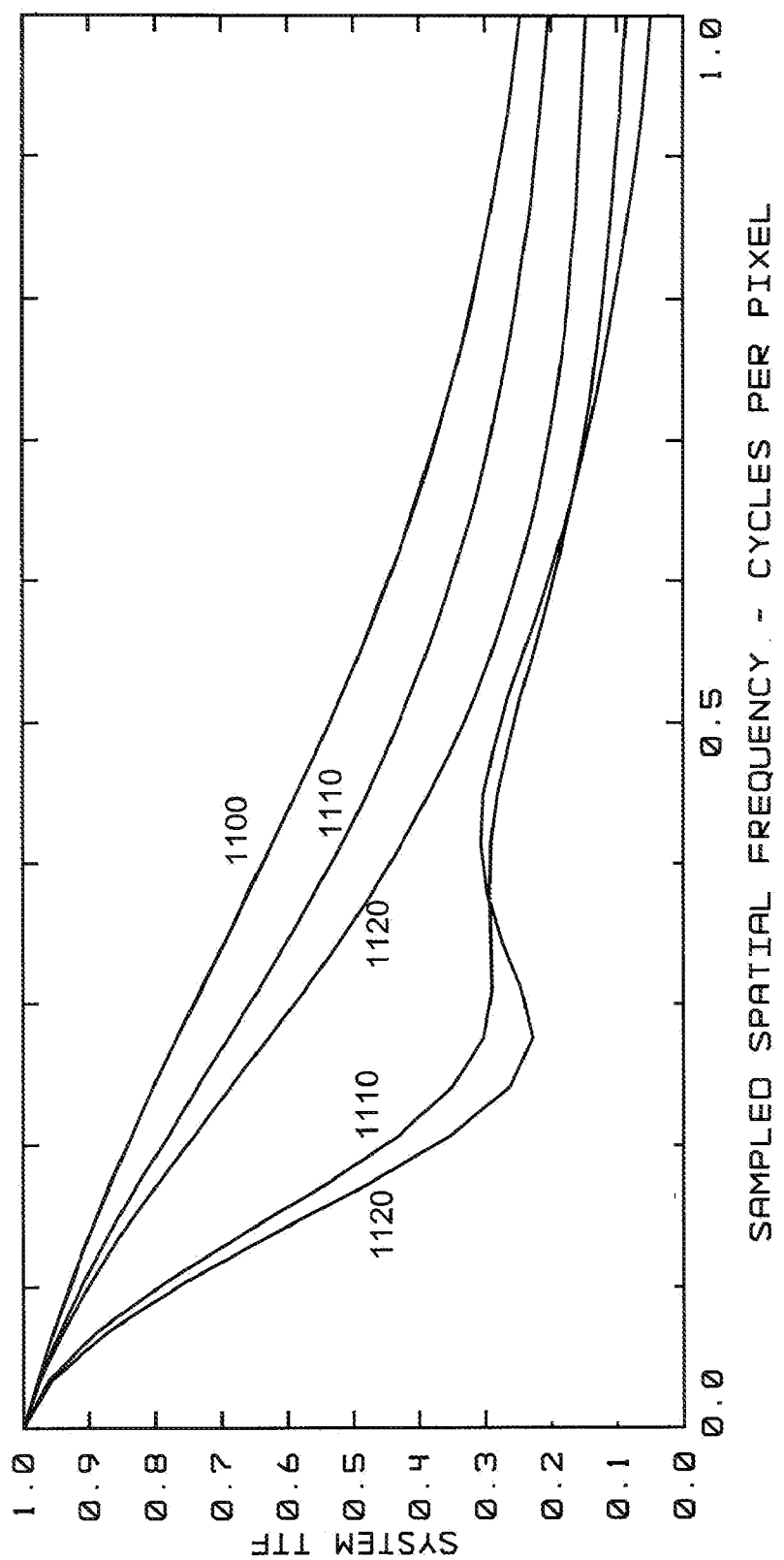
FIG. 11a graphs MTFs of the catadioptric optical system.
Figure 11B:
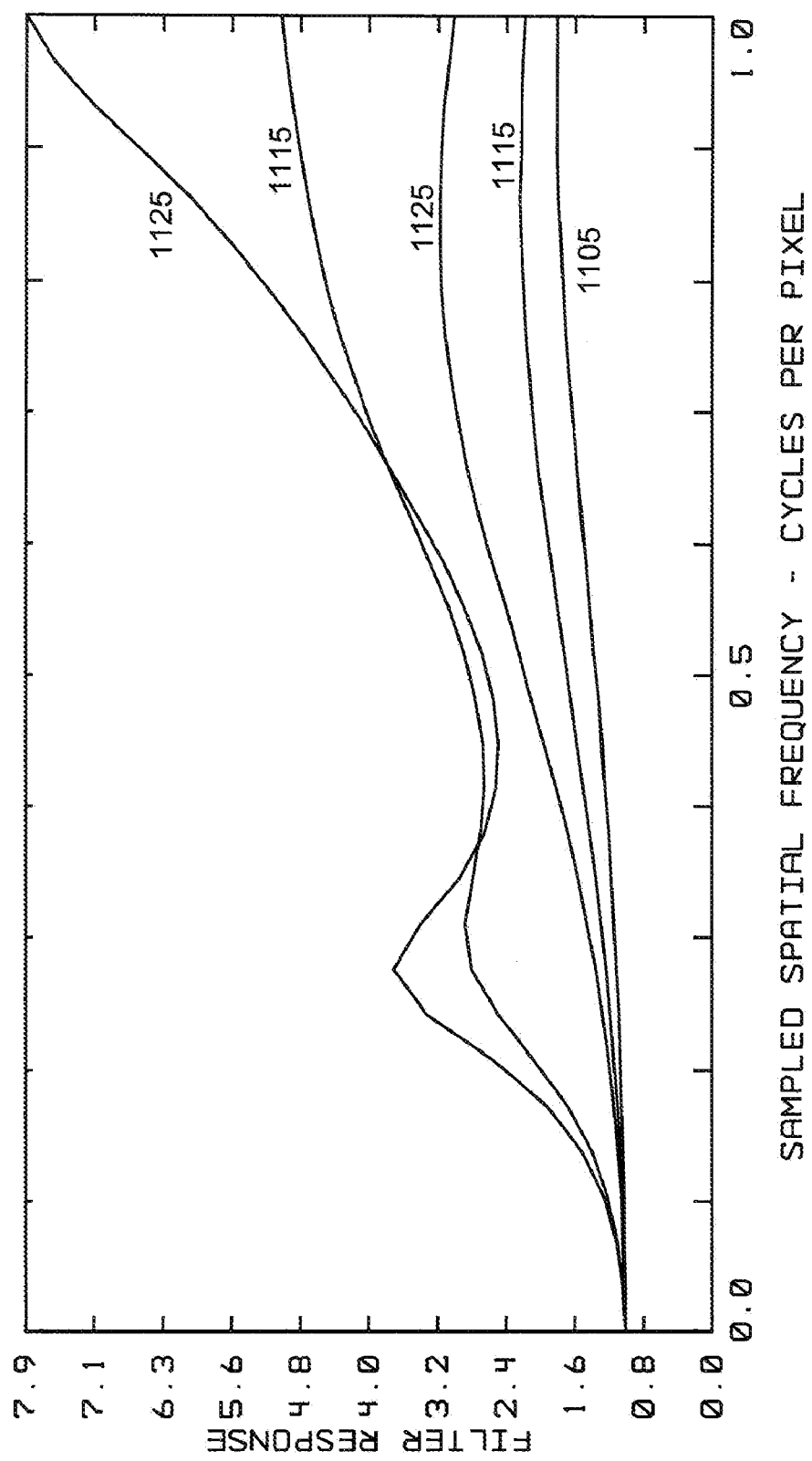
FIG. 11b graphs the corresponding Wiener filter responses required to restore the overall system to diffraction limited operation.
Figure 12B:
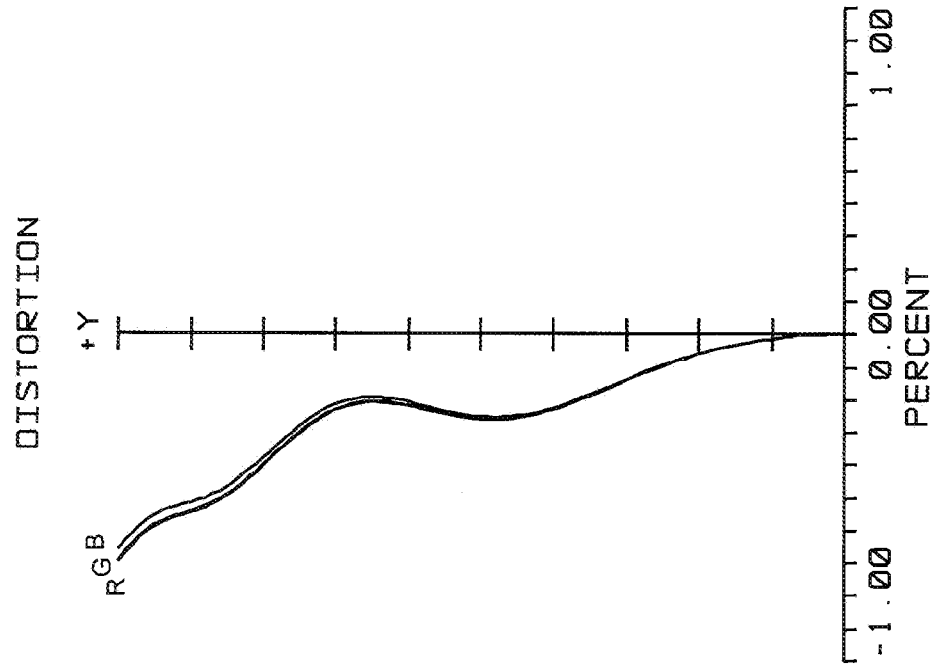
FIGS. 12a and 12b graph field curvature and distortion, respectively, for three different colors for the catadioptric optical system.
Figure 12A:
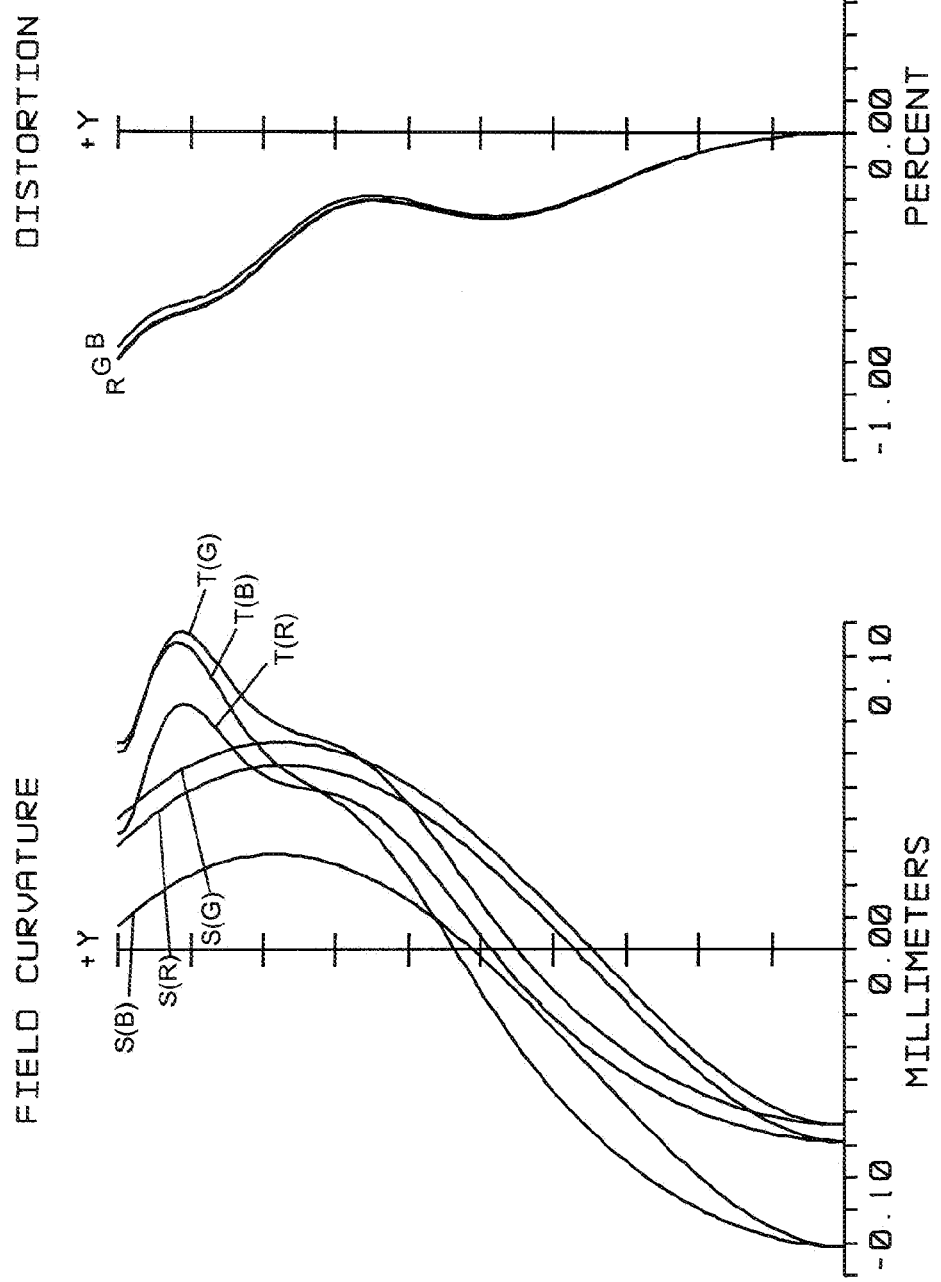

FIG. 10 shows MTFs for the optical subsystem at the red wavelength of 0.656 μm. The MTF curves show that there is a loss of resolution due to an insufficient number of degrees of freedom in the design space to satisfy design requirements. These aberrations, however, have been balanced such that the contrast lost can be restored via digital processing. FIG. 11a shows the MTF of the optical subsystem before digital processing for a few field locations. Curves 1100, 1110 and 1120 correspond to field(y,x) locations of (0,0), (1.60,0) and (2.27, 0), respectively. There are two curves 1110 and 1120, corresponding to the sagittal and tangential MTFs. The wavelength is the red wavelength of 0.656 μm. The Nyquist frequency is 270 lp/mm and the diffraction limit is 583 lp/mm. FIG. 11b shows the corresponding digital filter spectral responses required to restore the system to an equivalent F/2.8 diffraction limited MTF. Such Wiener filters amplify the noise by an average of 2.5× over the image field. Filters 1105, 1115 and 1125 in FIG. 11b correspond to MTFs 1100, 1110 and 1120 in FIG. 11a, respectively. Further image processing can be used to handle cases where the paper document is not flat, which can be modeled as a defocus error. FIGS. 12a and 12b shows graphs of the field curvature and distortion, at three different colors. The curves are labelled as R, G and B, corresponding to wavelengths of 0.656 μm, 0.588 μm and 0.486 μm, respectively.

Figure 13A:
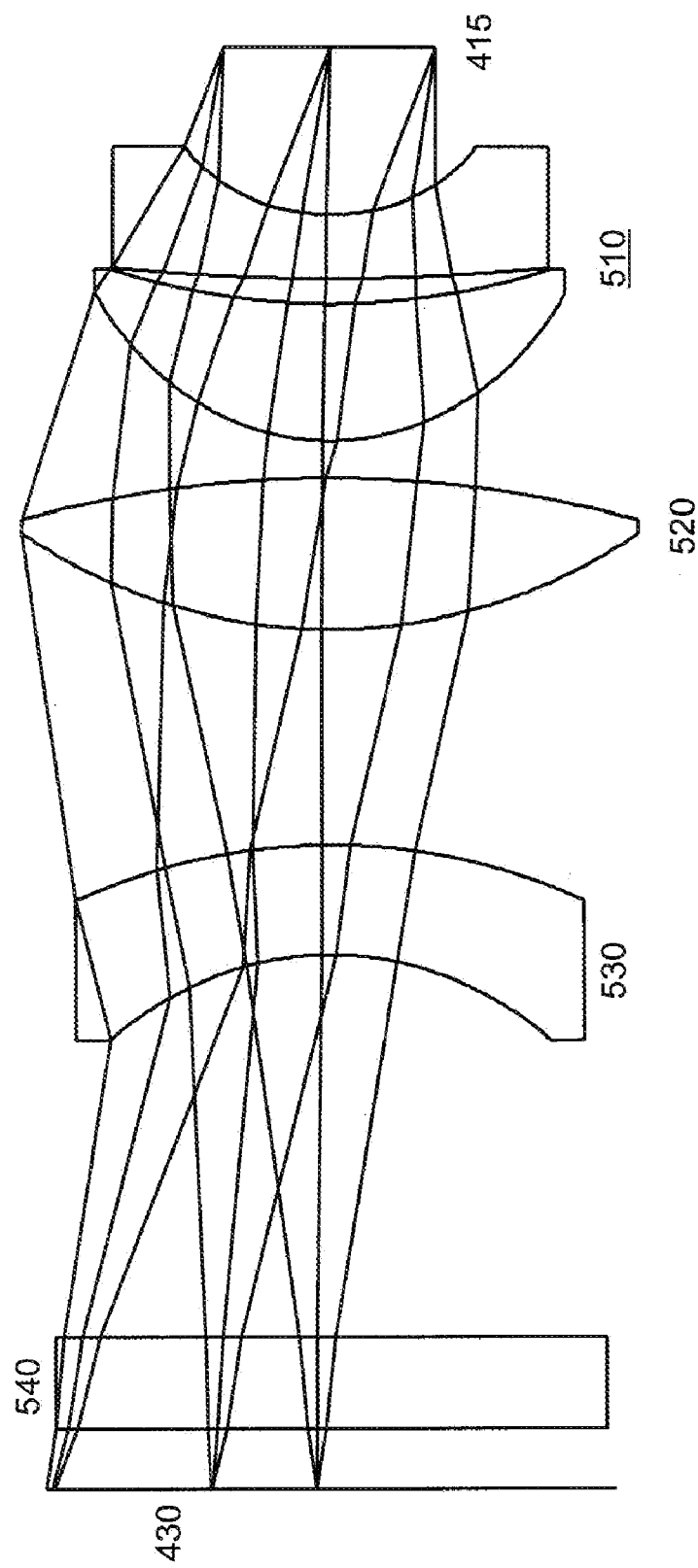
Figure 13D:
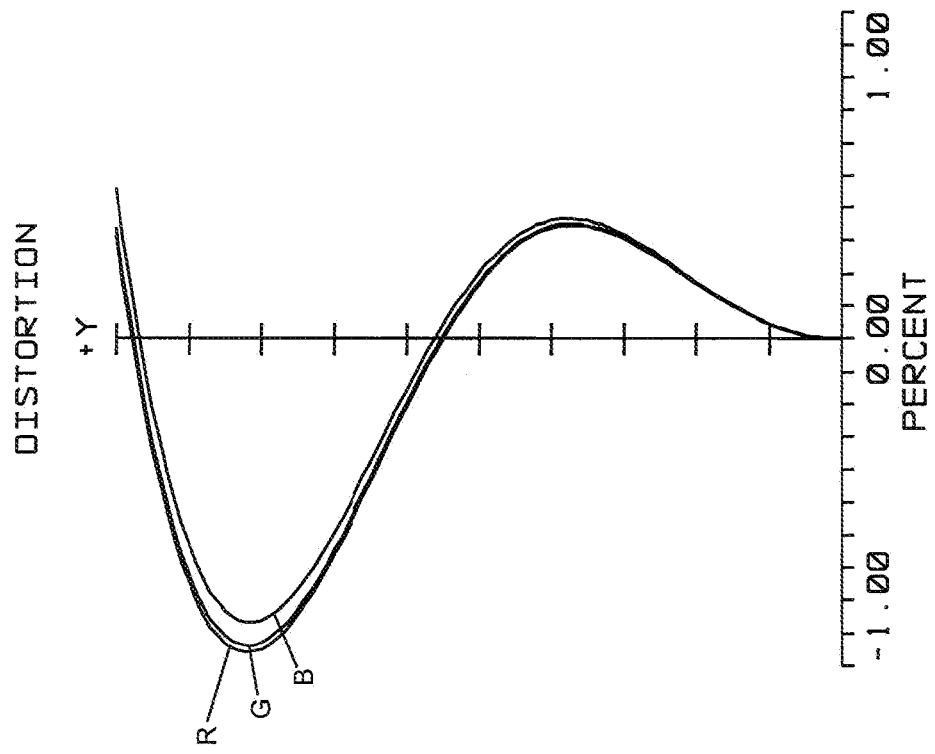
Figure 13C:
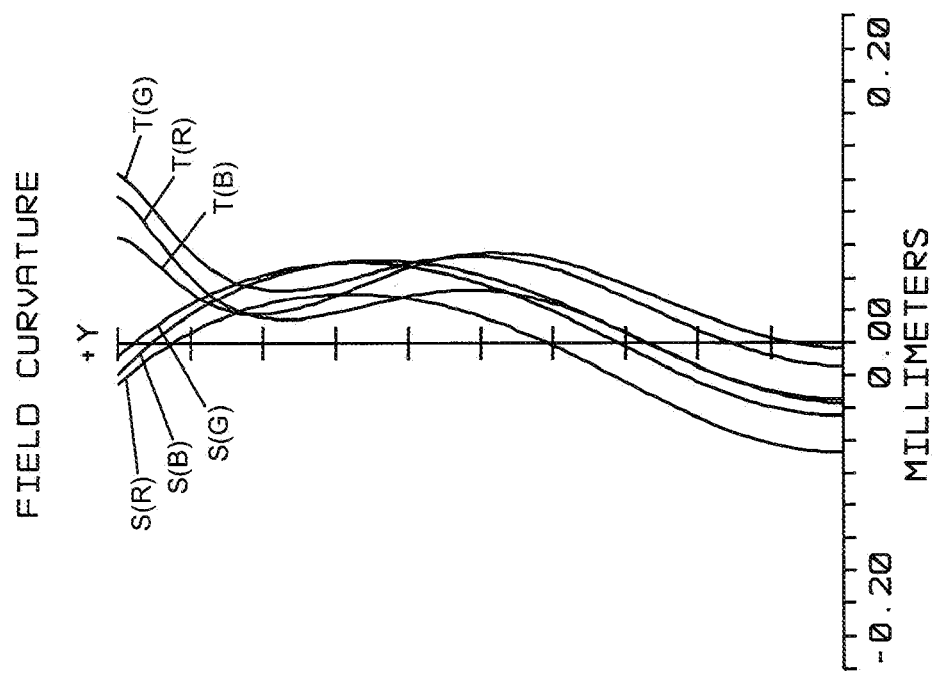
Figure 14A:
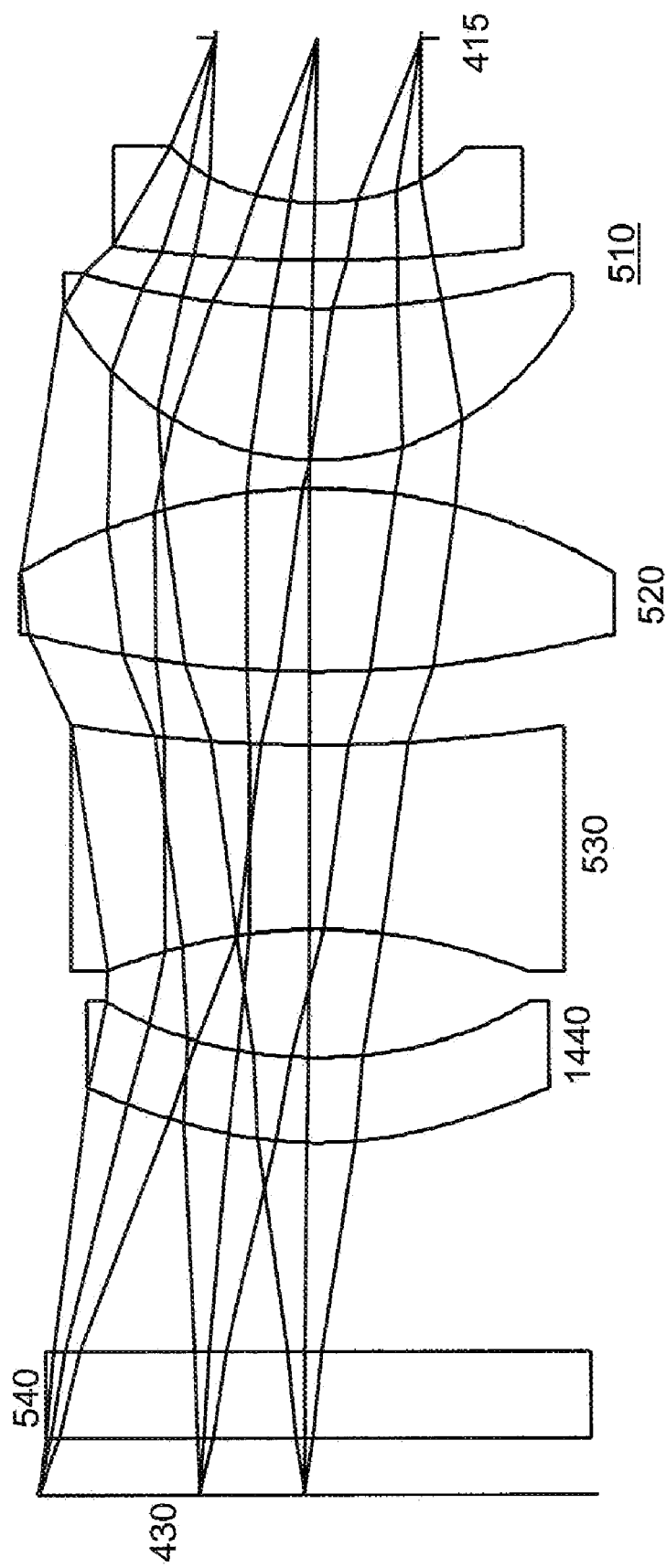
Figure 14D:
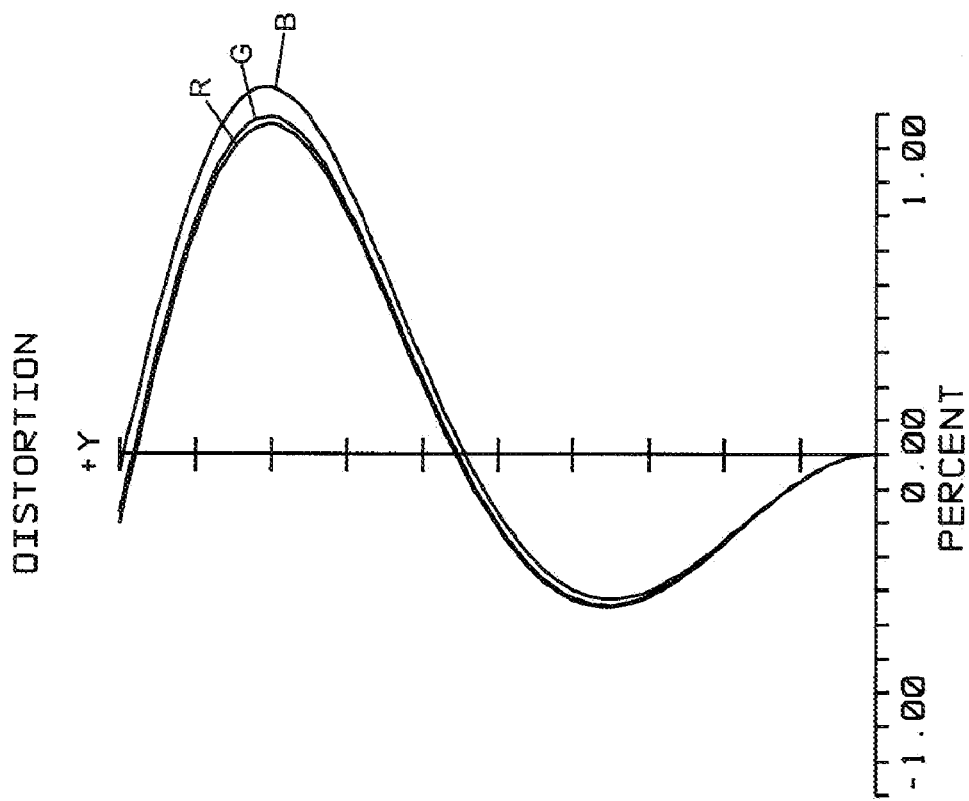
Figure 14C:
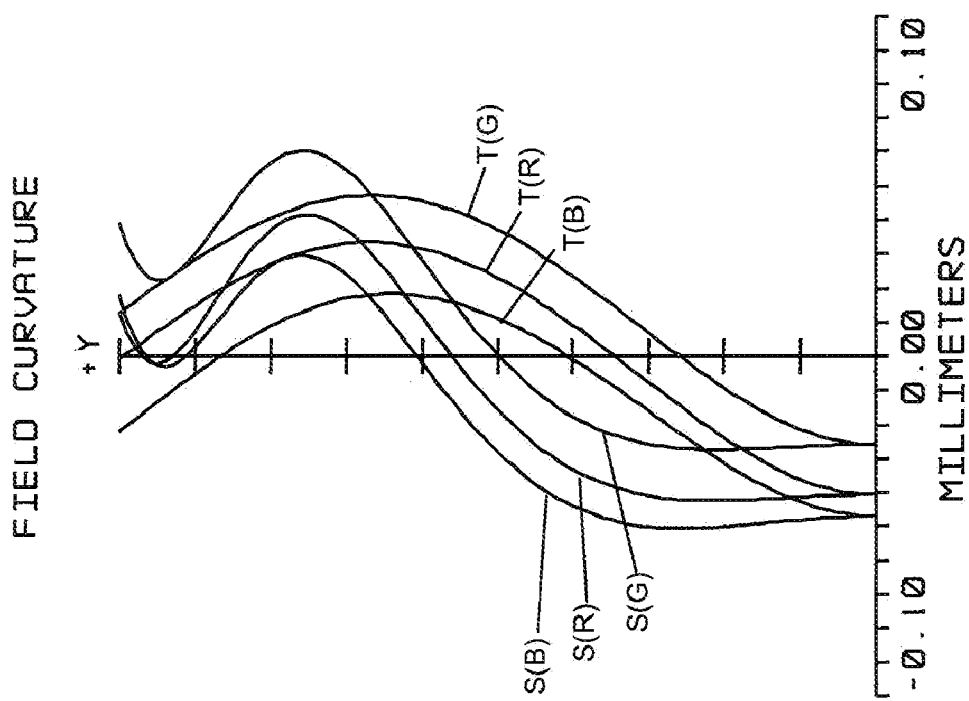
Figure 15A:
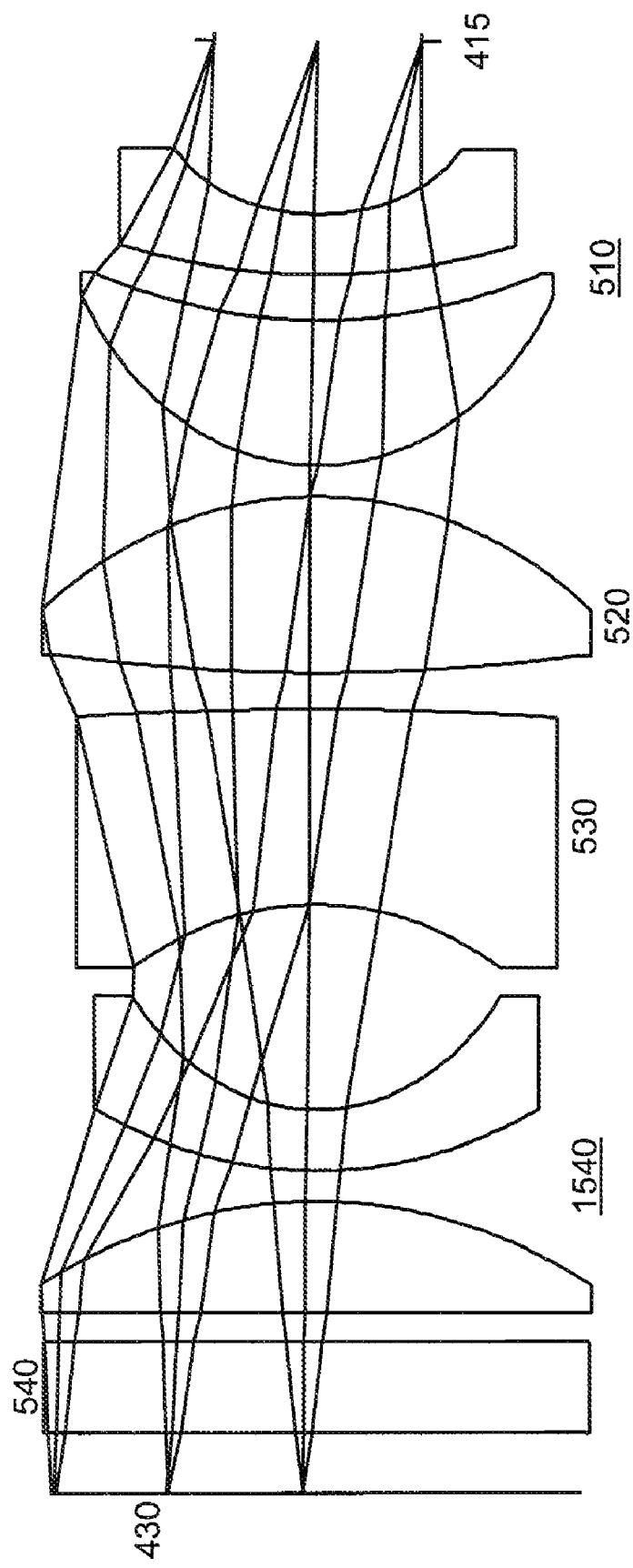
Figure 15D:
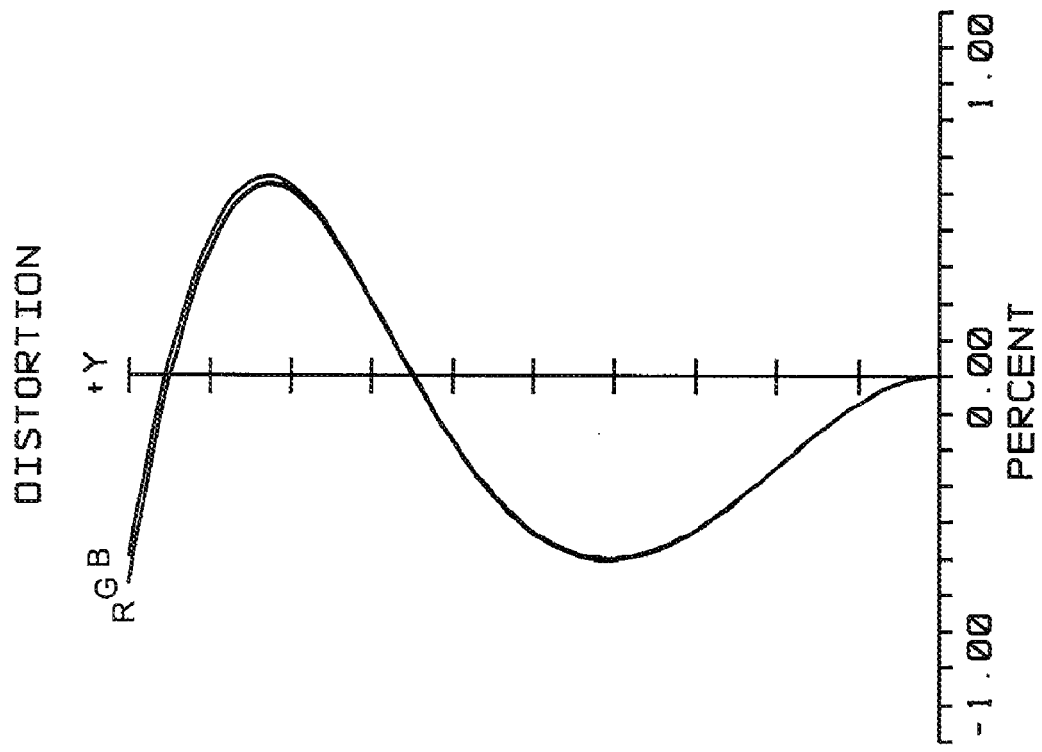
Figure 15C:
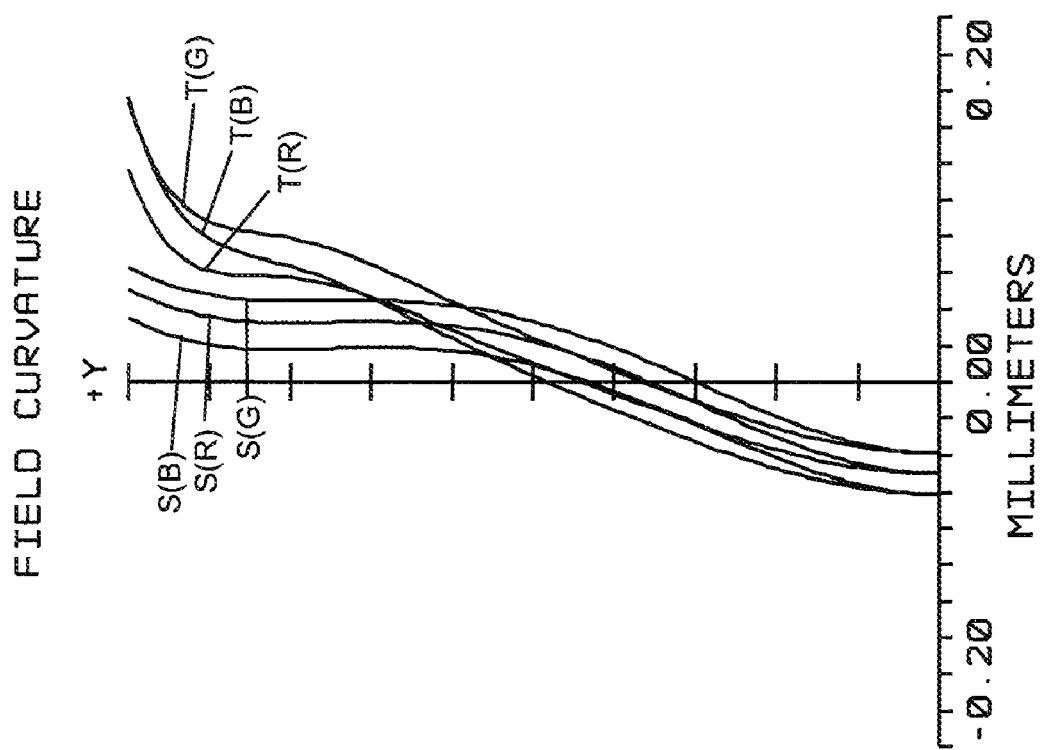

FIGS. 13-15 show alternate designs for lens system 420. In each of these figures, subfigure (a) is a cross-section of the lens system, subfigure (b) is the optical prescription, and subfigures (c) and (d) graph the field curvature and distortion, respectively. All designs have generally similar MTFs, in that the MTF before image processing is typically well below the diffraction limit but extends out to the Nyquist rate without crossing zero. As a result, image processing can be used to enhance the contrast of the captured image.

All three designs use three lens groups: negative 510, positive 520 and negative 530. FIG. 13 shows a four-element design, which has two lens elements in the first negative lens group 510. The first element in this design is not rotationally symmetric and this extra design freedom is used to compensate for field curvature. FIG. 14 shows a five-element design, which can be categorized as four elements implementing the basic negative-positive-negative design, followed by a single element 1440 used primarily to correct field curvature. FIG. 15 shows a six-element design, where the last two elements are used to correct field curvature.

Although the detailed description contains many specifics, these should not be construed as limiting the scope of the invention but merely as illustrating different examples and aspects of the invention. It should be appreciated that the scope of the invention includes other embodiments not discussed in detail above. For example, in alternate embodiments, the entire system can be scaled in size to be larger and/or smaller and/or to accommodate different shapes (such as A4 instead of 8.5"×11"). In one example, a larger version could be used to image a flat surface, for example for the purpose of tracking document objects or bar-code printouts. As another example, alternate embodiments are not limited to offset geometries or to 180 degrees of mirror 410. An entire 360 degrees could be imaged. Alternately, two 8.5"×11" object areas could be imaged simultaneously. Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

What is claimed is:

1. An offset catadioptric system comprising, in order along an optical path from an object field to a corresponding image field:
   a convex mirror positioned opposite to the object field, the convex mirror defining an optical axis;
   a lens system, wherein the lens system is a zoom lens system; and
   an image sensor, the convex mirror and the lens system acting in concert to image the object field onto the image sensor, the image sensor and the object field positioned on opposite sides of the optical axis.

2. The offset catadioptric system of claim 1 wherein the convex mirror is a rectifying mirror that substantially corrects for distortion between the object field and the image field and the rectifying mirror has a rotationally symmetric figure not defined by either $$\frac{2F'(x)}{1-F'(x)^2} = \frac{d(x)-x}{F(x)}$$

where a ray that leaves an object point at radius d(x) hits both the mirror and the image plane at a radius x and F(x) is the cross-sectional shape of the mirror; or $$\frac{\frac{x}{f} + \frac{2F'(t)}{1-F'(t)^2}}{1 - \frac{x}{f}\frac{2F'(t)}{1-F'(t)^2}} = \frac{d(x)-t}{F(t)}$$

where a ray that leaves an object point at radius d(x) hits the mirror at radius t(x) and is reflected to the image plane at a radius x, f is the focal length which by geometry is given by F(t)=f+h+f/xt, where h is the distance along the optical axis from the object plane to the image plane.

3. The offset catadioptric system of claim 1 wherein the object field is a planar object field; the optical axis is perpendicular to the object field; and the convex mirror is rotationally symmetric with the axis of rotation coincident with the optical axis.

4. The offset catadioptric system of claim 3 wherein the lens system consists of lens elements, all of which are rotationally symmetric about the optical axis.

5. The offset catadioptric system of claim 3 wherein the lens system comprises lens elements, at least one of which is not rotationally symmetric about the optical axis.

6. The offset catadioptric system of claim 3 wherein the convex mirror spans approximately 180 degrees about the optical axis and the convex mirror is positioned on the same side of the optical axis as the object field.

7. The offset catadioptric system of claim 1 further comprising:
   an aperture stop located between the convex mirror and the lens system.

8. The offset catadioptric system of claim 1 further comprising:
   a light source that directs light to the convex mirror for illuminating the object field.

9. The offset catadioptric system of claim 1 wherein the convex mirror and lens system together have an MTF that does not reach zero below a Nyquist frequency for the image sensor.

10. The offset catadioptric system of claim 1 further comprising:
    an image processor coupled to the image sensor, the image processor applying image processing to an image captured by the image sensor.

11. The offset catadioptric system of claim 10 wherein the image processor applies field-dependent gain to correct for uneven illumination of the object field.

12. The offset catadioptric system of claim 10 wherein the image processor applies field-dependent filters to correct for aberrations not compensated by the convex mirror and lens system.

13. The offset catadioptric system of claim 12 wherein the field-dependent filters are Wiener filters.

14. A document imager for imaging 8.5"×11" and/or A4 documents, comprising, in order along an optical path from an object field for the documents to a corresponding image field:
    a convex rectifying mirror that substantially corrects for distortion between the object field and the image field, the mirror positioned opposite to the object field, the mirror defining an optical axis and separated from the object field by not more than 5" along the optical axis;
    a lens system; and
    an image sensor, the mirror and the lens system acting in concert to image the object field onto the image sensor at a resolution of at least 300 dpi across the object field, the image sensor and the object field positioned on opposite sides of the optical axis.

15. The document imager of claim 14 wherein the document imager has a half field of view of at least 60 degrees and the field of view of individual pixels in the sensor is not more than 0.03 degrees.

16. The document imager of claim 14 wherein the document imager is a color document imager with a resolution of at least 300 dpi per color across the object field.

17. The document imager of claim 14 further comprising:
    an aperture stop located between the mirror and the lens system, with no other lens elements located between the aperture stop and the lens system.

18. The document imager of claim 17 wherein the lens system comprises:
    a first negative lens group, a second positive lens group and a third negative lens group in that order along the optical path, and with no other lens elements between the aperture stop and the third negative lens group.

19. The document imager of claim 18 wherein the lens system further comprises:
    a fourth lens group for correcting field curvature, the fourth lens group located between the third lens group and the image sensor.

20. The document imager of claim 17 wherein the lens system comprises
    a first negative lens element, a second positive lens element, a third positive lens element and a fourth negative lens element in that order along the optical path, and with no other lens elements between the aperture stop and the fourth negative lens element.

21. The document imager of claim 20 wherein the lens system further comprises:
    a fifth lens element for correcting field curvature, the fifth lens element located between the fourth negative lens element and the image sensor.

22. The document imager of claim 17 wherein the mirror and lens system together have an MTF that does not reach zero below a Nyquist frequency for the image sensor.

23. The document imager of claim 14 further comprising:
an image processor coupled to the image sensor, the image processor applying image processing to an image captured by the image sensor.

24. The document imager of claim 23 wherein the image processor applies field-dependent filters to correct for aberrations not compensated by the mirror and lens system.

25. The document imager of claim 14 wherein the mirror spans approximately 180 degrees about the optical axis and the mirror is positioned on the same side of the optical axis as the object field.

26. The document imager of claim 14 wherein the lens system is a zoom lens system.

27. The document imager of claim 14 wherein the document imager is F/2.8 or faster.

28. The document imager of claim 14 further comprising:
a housing containing the mirror, lens system and image sensor, the housing small enough to be portable by hand.

29. The document imager of claim 14 further comprising:
a document holder for positioning the documents at the object field.

30. The document imager of claim 29 wherein documents are automatically imaged upon placement in the document holder.

31. The document imager of claim 14 further comprising:
a light source that directs light to the mirror for illuminating the object field.

32. The document imager of claim 14 further comprising a communications port for communicating with a computing device.

33. An imaging system comprising, in order along an optical path from an object field to a corresponding image field:
a convex mirror positioned opposite to the object field, the convex mirror defining an optical axis;
a lens system comprising an aperture stop, a first negative lens group, a second positive lens group and a third negative lens group in that order along the optical path, and with no other lens elements between the aperture stop and the third negative lens group; and
an image sensor, the convex mirror and the lens system acting in concert to image the object field onto the image sensor.

34. The imaging system of claim 33 wherein the first negative lens group consists of two lens elements, the second positive lens group consists of one positive lens element, and the third negative lens group consists of one negative lens element.

35. The imaging system of claim 34 wherein at least three of the four lens elements are rotationally symmetric.

36. The imaging system of claim 34 wherein the lens system further comprises:
a fourth lens group for correcting field curvature, the fourth lens group located between the third lens group and the image sensor.

37. The imaging system of claim 36 wherein the fourth lens group consists of one lens element.

38. The imaging system of claim 36 wherein the fourth lens group consists of two lens elements.

39. The imaging system of claim 33 wherein the first negative lens group consists of three lens elements, the second positive lens group consists of one positive lens element, and the third negative lens group consists of one negative lens element.

40. The imaging system of claim 39 wherein one of the three lens elements in the first negative lens group is an asphere, and the negative lens element in the third negative lens group is an asphere.

41. The imaging system of claim 33 wherein the convex mirror is a rectifying mirror that substantially corrects for distortion between the object field and the image field.

42. The imaging system of claim 41 wherein the rectifying mirror has a rotationally symmetric figure not defined by either $$\frac{2F'(x)}{1-F'(x)^2} = \frac{d(x)-x}{F(x)}$$

where a ray that leaves an object point at radius d(x) hits both the mirror and the image plane at a radius x and F(x) is the cross-sectional shape of the mirror; or $$\frac{\frac{x}{f} + \frac{2F'(t)}{1-F'(t)^2}}{1 - \frac{x}{f}\frac{2F'(t)}{1-F'(t)^2}} = \frac{d(x)-t}{F(t)}$$

where a ray that leaves an object point at radius d(x) hits the mirror at radius t(x) and is reflected to the image plane at a radius x, f is the focal length which by geometry is given by F(t)=f+h+f/xt, where h is the distance along the optical axis from the object plane to the image plane.

43. The imaging system of claim 33 wherein the object field is a planar object field;
the optical axis is perpendicular to the object field; and the convex mirror has a rotationally symmetric figure, the axis of rotation coincident with the optical axis.

44. The imaging system of claim 33 wherein the lens system is a zoom lens system.

45. The imaging system of claim 33 wherein the convex mirror and lens system together have an MTF that does not reach zero below a Nyquist frequency for the image sensor.

46. The imaging system of claim 33 further comprising:
an image processor coupled to the image sensor, the image processor applying image processing to an image captured by the image sensor.

47. An imaging system comprising, in order along an optical path from an object field to a corresponding image field:
a convex mirror positioned opposite to the object field, the convex mirror defining an optical axis;
a lens system comprising an aperture stop, a first negative lens element, a second positive lens element, a third positive lens element and a fourth negative lens element in that order along the optical path, and with no other lens elements between the aperture stop and the fourth negative lens element; and
an image sensor, the convex mirror and the lens system acting in concert to image the object field onto the image sensor.

48. The imaging system of claim 47 wherein at least three of the lens elements are rotationally symmetric.

49. The imaging system of claim 47 wherein the lens system further comprises:
a fifth lens element for correcting field curvature, the fifth lens element located between the fourth negative lens element and the image sensor.

50. The imaging system of claim 47 wherein the convex mirror is a rectifying mirror that substantially corrects for distortion between the object field and the image field.

51. The imaging system of claim 50 wherein the rectifying mirror has a rotationally symmetric figure not defined by either $$\frac{2F'(x)}{1-F'(x)^2} = \frac{d(x)-x}{F(x)}$$

where a ray that leaves an object point at radius d(x) hits both the mirror and the image plane at a radius x and F(x) is the cross-sectional shape of the mirror; or $$\frac{\frac{x}{f} + \frac{2F'(t)}{1-F'(t)^2}}{1 - \frac{x}{f}\frac{2F'(t)}{1-F'(t)^2}} = \frac{d(x)-t}{F(t)}$$

where a ray that leaves an object point at radius d(x) hits the mirror at radius t(x) and is reflected to the image plane at a radius x, f is the focal length which by geometry is given by F(t)=f+h+f/xt, where h is the distance along the optical axis from the object plane to the image plane.

52. The imaging system of claim 47 wherein the object field is a planar object field;
the optical axis is perpendicular to the object field; and the convex mirror has a rotationally symmetric figure, the axis of rotation coincident with the optical axis.

53. The imaging system of claim 47 wherein the lens system is a zoom lens system.

54. The imaging system of claim 47 wherein the convex mirror and lens system together have an MTF that does not reach zero below a Nyquist frequency for the image sensor.

55. The imaging system of claim 47 further comprising:
an image processor coupled to the image sensor, the image processor applying image processing to an image captured by the image sensor.

* * * * *